US012654882B2

(12) United States Patent     (10) Patent No.:   US 12,654,882 B2
Li et al.     (45) Date of Patent:    Jun. 16, 2026

(54) APPARATUSES, COMPUTER-IMPLEMENTED METHODS, AND COMPUTER PROGRAM PRODUCTS FOR REMEDIATION OF ABNORMAL VEHICLE EVENTS

(71) Applicant: Honeywell International Inc., Charlotte, NC (US)

(72) Inventors: Zhaohui Li, Beijing (CN); Yuyun Li, Beijing (CN)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 22 days.

(21) Appl. No.: 18/436,387

(22) Filed: Feb. 8, 2024

(65) Prior Publication Data

US 2025/0256863 A1     Aug. 14, 2025

(51) Int. Cl.
*B64F 5/60*       (2017.01)
*B64F 5/40*       (2017.01)
(Continued)

(52) U.S. Cl.
CPC .................. *B64F 5/60* (2017.01); *B64F 5/40* (2017.01); *G07C 5/006* (2013.01); *G07C 5/0808* (2013.01); *G07C 5/0825* (2013.01)

(58) Field of Classification Search
CPC ... B64F 5/60; B64F 5/40; G07C 5/006; G07C 5/0808; G07C 5/0825
See application file for complete search history.

(56) References Cited

U.S. PATENT DOCUMENTS 6,748,304 B2 *   6/2004   Felke ........................ B64F 5/60
                                 701/32.9
7,242,311 B2 *   7/2007   Hoff ..................... G05B 23/027
                                 340/459
(Continued)

FOREIGN PATENT DOCUMENTS

CA       3128997 A1 *   2/2022   ........... G07C 5/0816
CN     109582670 A   *   4/2019   ............. G06Q 10/20
(Continued)

OTHER PUBLICATIONS

Extended European Search Report Mailed on Jun. 30, 2025 for EP Application No. 25152043, 8 page(s).

*Primary Examiner* — Babar Sarwar
(74) *Attorney, Agent, or Firm* — ALSTON & BIRD LLP

(57) ABSTRACT

Embodiments of the disclosure provide for model-based generation of corrective actions for remediating an abnormal event. Some embodiments cause rendering of a graphical user interface (GUI) via a computing device, where the GUI comprises a ranking of a plurality of corrective actions associated with at least one abnormal event. In some embodiments, the ranking of the plurality of corrective actions is obtained from a model that establishes mappings between the at least one predefined abnormal event and historical data. Some embodiments receive, from the computing device, feedback data via the GUI, the feedback data indicating a successfulness of resolution associated with implementing at least one of the plurality of corrective actions. Some embodiments update the model to improve a scoring of the at least one predefined abnormal event based at least in part on the feedback data.

18 Claims, 10 Drawing Sheets

(51) Int. Cl.
    *G07C 5/00*     (2006.01)
    *G07C 5/08*     (2006.01)

(56)         References Cited

U.S. PATENT DOCUMENTS

| | | | | |
|---|---|---|---|---|
| 8,093,734 | B2 * | 1/2012 | Yuri | F24D 11/006 |
| | | | | 290/40 C |
| 8,659,413 | B2 * | 2/2014 | Sutherland | E02F 9/268 |
| | | | | 340/459 |
| 9,113,306 | B2 * | 8/2015 | Jackson | H04W 4/029 |
| 9,239,677 | B2 * | 1/2016 | Ording | G06F 3/04883 |
| 9,292,111 | B2 * | 3/2016 | Westerman | G06F 3/04883 |
| 9,437,098 | B2 * | 9/2016 | Kinugawa | G08B 5/00 |
| 9,570,045 | B2 * | 2/2017 | Tsutsui | G09G 5/14 |
| 9,725,008 | B2 * | 8/2017 | Wu | B60L 50/61 |
| 9,972,143 | B1 * | 5/2018 | Garai | G07C 5/12 |
| 10,388,087 | B2 | 8/2019 | Bandy et al. | |
| 10,426,087 | B2 * | 10/2019 | Bruns | A01D 41/127 |
| 10,839,015 | B1 * | 11/2020 | Leise | H04W 12/106 |
| 10,963,797 | B2 * | 3/2021 | Vyas | G06Q 10/20 |
| 10,976,750 | B2 * | 4/2021 | Luo | H04W 4/44 |
| 11,299,153 | B2 * | 4/2022 | Tanaka | B60W 40/08 |
| 11,436,876 | B2 * | 9/2022 | Hu | G08G 1/166 |
| 11,551,488 | B2 * | 1/2023 | Sankavaram | G06N 5/01 |
| 11,654,938 | B1 * | 5/2023 | Kumar | B60W 60/0053 |
| | | | | 701/23 |
| 11,769,352 | B2 * | 9/2023 | Dos Santos | G06Q 10/08 |
| | | | | 701/29.1 |
| 11,801,870 | B2 * | 10/2023 | Salehi | B60W 10/20 |
| 11,828,732 | B1 * | 11/2023 | Knas | G07C 5/008 |
| 12,037,015 | B2 * | 7/2024 | Xiang | B60W 50/0205 |
| 12,236,733 | B2 * | 2/2025 | Singh | G06Q 30/0206 |
| 12,415,525 | B1 * | 9/2025 | Automata | B60W 50/0205 |
| 2004/0034456 | A1 | 2/2004 | Felke et al. | |

| | | | | |
|---|---|---|---|---|
| 2004/0085198 | A1 * | 5/2004 | Saito | B60G 17/0195 |
| | | | | 701/31.4 |
| 2006/0092033 | A1 * | 5/2006 | Hoff | G05B 23/027 |
| | | | | 700/83 |
| 2008/0306645 | A1 * | 12/2008 | Dewhurst | G07C 5/008 |
| | | | | 701/31.4 |
| 2009/0112398 | A1 * | 4/2009 | Wempen | G07C 5/0808 |
| | | | | 701/33.4 |
| 2009/0216401 | A1 * | 8/2009 | Underdal | G07C 5/0808 |
| | | | | 701/33.4 |
| 2009/0300430 | A1 | 12/2009 | Nissan-Messing et al. | |
| 2016/0239847 | A1 * | 8/2016 | Arvapally | G06Q 30/016 |
| 2016/0304051 | A1 * | 10/2016 | Archer | G07C 5/0825 |
| 2018/0096539 | A1 * | 4/2018 | Merg | G07C 5/02 |
| 2018/0289999 | A1 * | 10/2018 | Kay | G07C 5/006 |
| 2019/0050458 | A1 * | 2/2019 | Merg | G07C 5/006 |
| 2019/0311558 | A1 * | 10/2019 | Bika | G07C 5/0841 |
| 2019/0347282 | A1 * | 11/2019 | Cai | G06N 5/022 |
| 2019/0367177 | A1 | 12/2019 | Pena et al. | |
| 2021/0335063 | A1 * | 10/2021 | Collins | G07C 5/0825 |
| 2021/0375080 | A1 * | 12/2021 | Kumar | G07C 5/008 |
| 2021/0390796 | A1 * | 12/2021 | Zhong | G05B 23/0221 |
| 2022/0309843 | A1 * | 9/2022 | Taki | G07C 5/0808 |
| 2023/0110616 | A1 * | 4/2023 | Mracek | B60R 16/0232 |
| | | | | 701/29.1 |
| 2023/0267775 | A1 * | 8/2023 | Dhoot | G06V 20/56 |
| | | | | 701/29.1 |
| 2025/0029429 | A1 * | 1/2025 | Layouni | G07C 5/0808 |
| 2025/0284582 | A1 * | 9/2025 | Andreasen | G07C 5/0841 |

FOREIGN PATENT DOCUMENTS

| | | | | | |
|---|---|---|---|---|---|
| CN | 111369704 | A | * | 7/2020 | G07C 5/008 |
| CN | 116572838 | A | * | 8/2023 | B60R 1/00 |
| EP | 1545974 | A1 | | 6/2005 | |

* cited by examiner

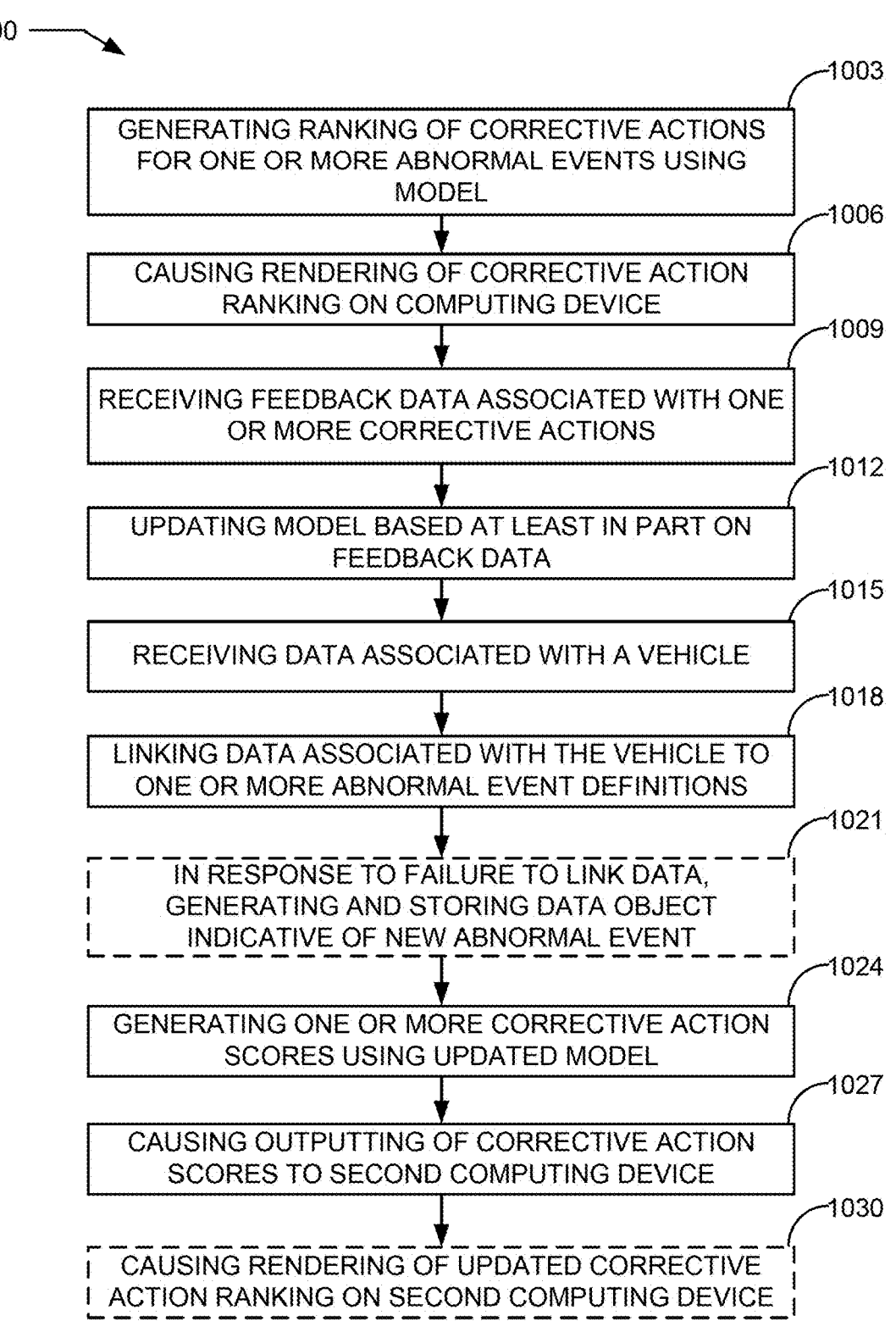

1000

1003
GENERATING RANKING OF CORRECTIVE ACTIONS FOR ONE OR MORE ABNORMAL EVENTS USING MODEL

1006
CAUSING RENDERING OF CORRECTIVE ACTION RANKING ON COMPUTING DEVICE

1009
RECEIVING FEEDBACK DATA ASSOCIATED WITH ONE OR MORE CORRECTIVE ACTIONS

1012
UPDATING MODEL BASED AT LEAST IN PART ON FEEDBACK DATA

1015
RECEIVING DATA ASSOCIATED WITH A VEHICLE

1018
LINKING DATA ASSOCIATED WITH THE VEHICLE TO ONE OR MORE ABNORMAL EVENT DEFINITIONS

1021
IN RESPONSE TO FAILURE TO LINK DATA, GENERATING AND STORING DATA OBJECT INDICATIVE OF NEW ABNORMAL EVENT

1024
GENERATING ONE OR MORE CORRECTIVE ACTION SCORES USING UPDATED MODEL

1027
CAUSING OUTPUTTING OF CORRECTIVE ACTION SCORES TO SECOND COMPUTING DEVICE

1030
CAUSING RENDERING OF UPDATED CORRECTIVE ACTION RANKING ON SECOND COMPUTING DEVICE

FIG. 10

APPARATUSES, COMPUTER-IMPLEMENTED METHODS, AND COMPUTER PROGRAM PRODUCTS FOR REMEDIATION OF ABNORMAL VEHICLE EVENTS

TECHNOLOGICAL FIELD

Embodiments of the present disclosure are generally directed to generating and ranking corrective actions for responding to abnormal vehicle events.

BACKGROUND

Typical approaches to remediating abnormal vehicle events rely on operator experience and manual investigation of vehicle statuses and records. For example, to respond to the activation of a low oil pressure indicator, existing approaches may require a ground crew member to perform a diagnostic checklist including manual inspection of a plurality of vehicle components. The time required to pursue all potential solutions to an abnormal event may decrease efficiency of vehicle operation. Further, in existing approaches, the efficiency and accuracy of responding to abnormal events may significantly vary based on the experience level of responding personnel. As a result, reliance on experienced human capital may constrain the bandwidth and throughput of abnormal event remediation operations. For example, vehicle maintenance crews and/or vehicle operation personnel may demonstrate gaps in their collective knowledge base due to overall inexperience, which may inhibit the ability to quickly and correctly identify optimal corrective actions for mitigation, improvement, and/or reduction of safety risks associated with abnormal events.

Applicant has discovered various technical problems associated with identifying proper corrective actions to quickly remediate safety risks of abnormal vehicle events. Through applied effort, ingenuity, and innovation, Applicant has solved many of these identified problems by developing the embodiments of the present disclosure, which are described in detail below.

BRIEF SUMMARY

In general, embodiments of the present disclosure herein provide for modeling and generating corrective actions for remediating abnormal events to improve safety of vehicle operation. For example, embodiments of the present disclosure provide for generation of corrective actions based at least in part on automated recording and analysis of data associated with vehicle operation and abnormal events experienced by one or more vehicles. Other implementations for modeling and generating corrective actions for remediating abnormal events will be, or will become, apparent to one with skill in the art upon examination of the following figures and detailed description. It is intended that all such additional implementations be included within this description be within the scope of the disclosure, and be protected by the following claims.

In accordance with a first aspect of the disclosure, a computer-implemented method for model-based generation of corrective actions is provided. The computer-implemented method is executable utilizing any of a myriad of computing device(s) and/or combinations of hardware, software, firmware. In some example embodiments an example computer-implemented method includes causing rendering of a graphical user interface (GUI) via a computing device, where the GUI comprises a ranking of a plurality of corrective actions associated with at least one abnormal event; and the ranking of the plurality of corrective actions is obtained from a model that establishes mappings between the at least one predefined abnormal event and historical data; receiving, from the computing device, feedback data via the GUI, the feedback data indicating a successfulness of resolution associated with implementing at least one of the plurality of corrective actions; and updating the model to improve a scoring of the at least one predefined abnormal event based at least in part on the feedback data.

In some embodiments, the method includes receiving data associated with a vehicle; linking the data associated with the vehicle and the at least one predefined abnormal event; generating, using the updated model, a respective corrective action score for the plurality of corrective actions based at least in part on the data associated with the vehicle and the at least one predefined abnormal event, where a respective corrective action score indicates a likelihood that a corresponding corrective action will cause at least one of mitigation, improvement, or reduction of a safety risk of the at least predefined one abnormal event; and causing outputting of the plurality of corrective action scores to a second computing device. In some embodiments, the method includes generating an updated ranking of the plurality of corrective actions based at least in part on the plurality of corrective action scores; and causing rendering of a second GUI via the second computing device, the second GUI comprising the updated ranking. In some embodiments, the method includes, in response to a failure to link the data associated with the vehicle and the at least one predefined abnormal event, generating and storing a data object indicative of a new abnormal event linked with the data associated with the vehicle.

In some embodiments, the data associated with the vehicle comprises sensor data from at least one vehicle sensor. In some embodiments, the data associated with the vehicle comprises flight operational quality assurance (FOQA) data. In some embodiments, the data associated with the vehicle comprises one or more vehicle commands or maneuvers performed by an operator of the vehicle. In some embodiments, the data associated with the vehicle comprises one or more user inputs provided by an operator of the vehicle. In some embodiments, the data associated with the vehicle comprises environmental data associated with the vehicle. In some embodiments, the environmental data comprises at least one wind or weather condition experienced by the vehicle. In some embodiments, the data associated with the vehicle comprises vehicle infrastructure data comprising at least one of a runway condition or a ground traffic condition.

In some embodiments, the historical data comprises at least one abnormal event trigger. In some embodiments, the historical data comprises at least one abnormal event category. In some embodiments, the historical data comprises at least one abnormal event security level. In some embodiments, the historical data comprises at least one abnormal event validation pathway. In some embodiments, the historical data comprises at least one abnormal event cause. In some embodiments, the historical data comprises at least one historical corrective action.

In accordance with another aspect of the present disclosure, a computing apparatus for model-based generation of corrective actions is provided. The computing apparatus in some embodiments includes at least one processor and at least one non-transitory memory, the at least non-transitory one memory having computer-coded instructions stored thereon. The computer-coded instructions in execution with the at least one processor causes the apparatus to perform any one of the example computer-implemented methods described herein. In some other embodiments, the computing apparatus includes means for performing each step of any of the computer-implemented methods described herein.

In accordance with another aspect of the present disclosure, a computer program product for model-based generation of corrective actions is provided. The computer program product in some embodiments includes at least one non-transitory computer-readable storage medium having computer program code stored thereon. The computer program code in execution with at least one processor is configured for performing any one of the example computer-implemented methods described herein.

BRIEF DESCRIPTION OF THE DRAWINGS

Figure 1:
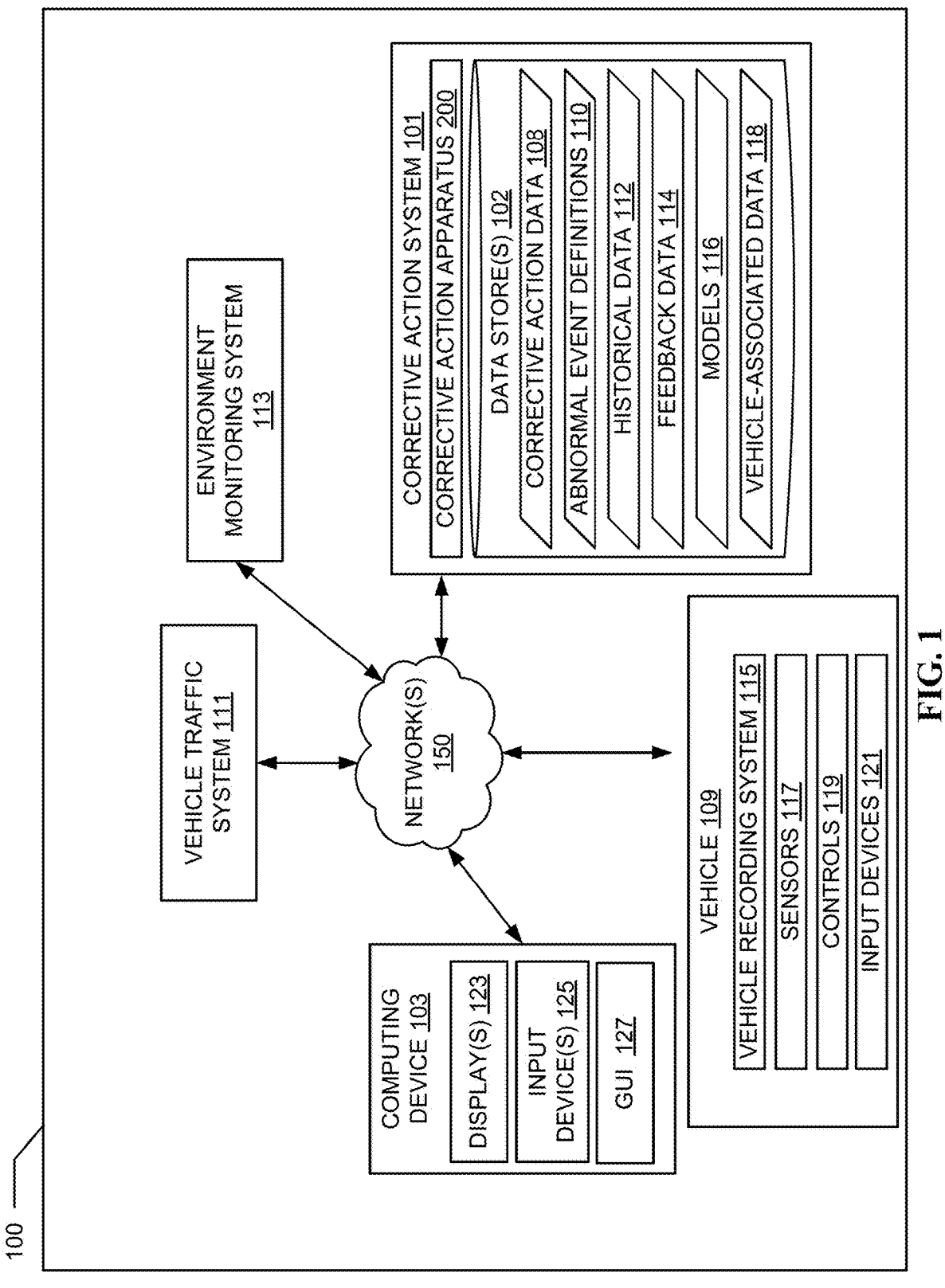

Having thus described the embodiments of the disclosure in general terms, reference now will be made to the accompanying drawings, which are not necessarily drawn to scale, and wherein:

FIG. 1 illustrates a block diagram of a networked environment that may be specially configured within which embodiments of the present disclosure may operate.

Figure 2:
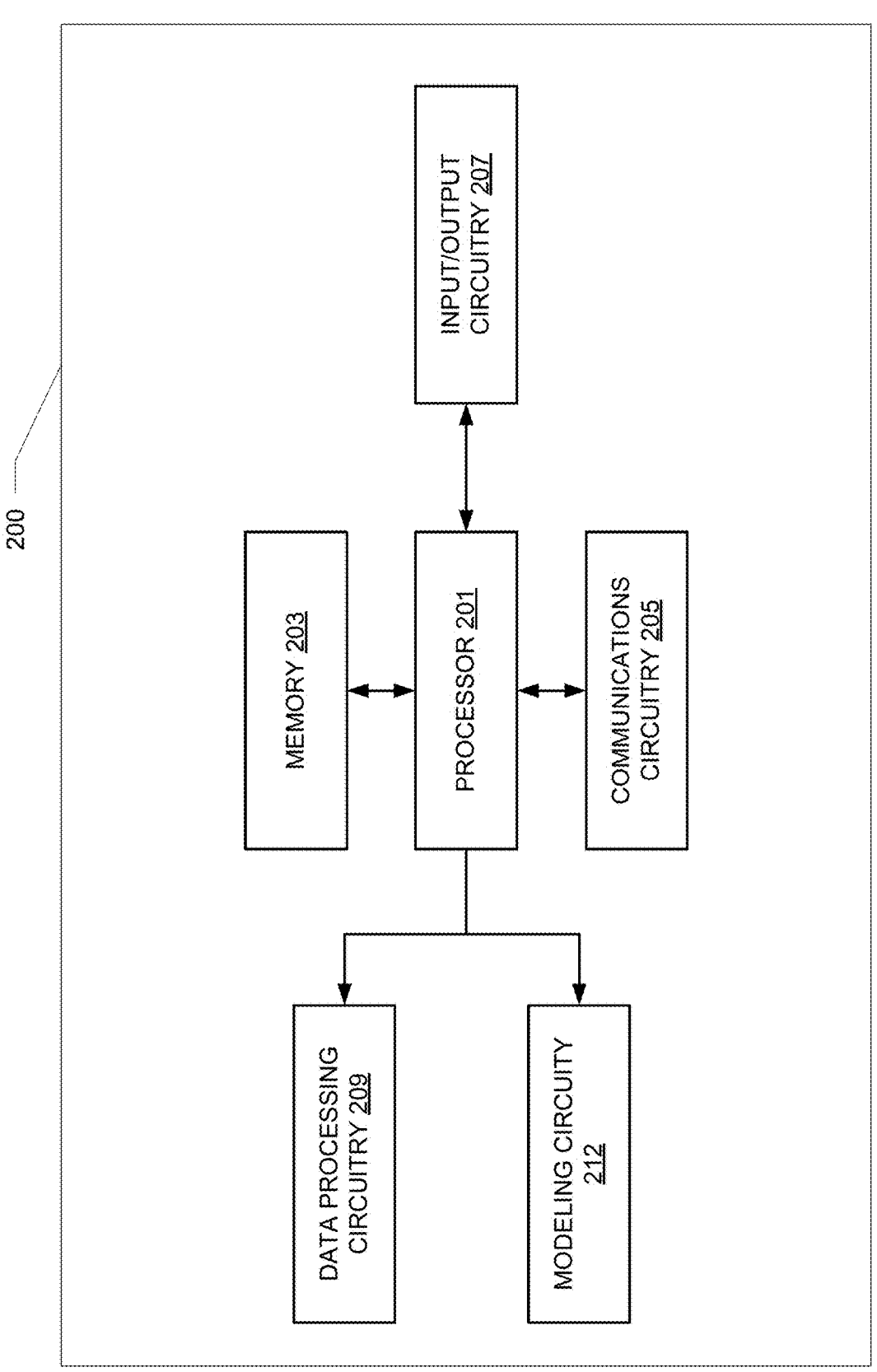

FIG. 2 illustrates a block diagram of an example apparatus that may be specially configured in accordance with at least some example embodiments of the present disclosure.

Figure 3:
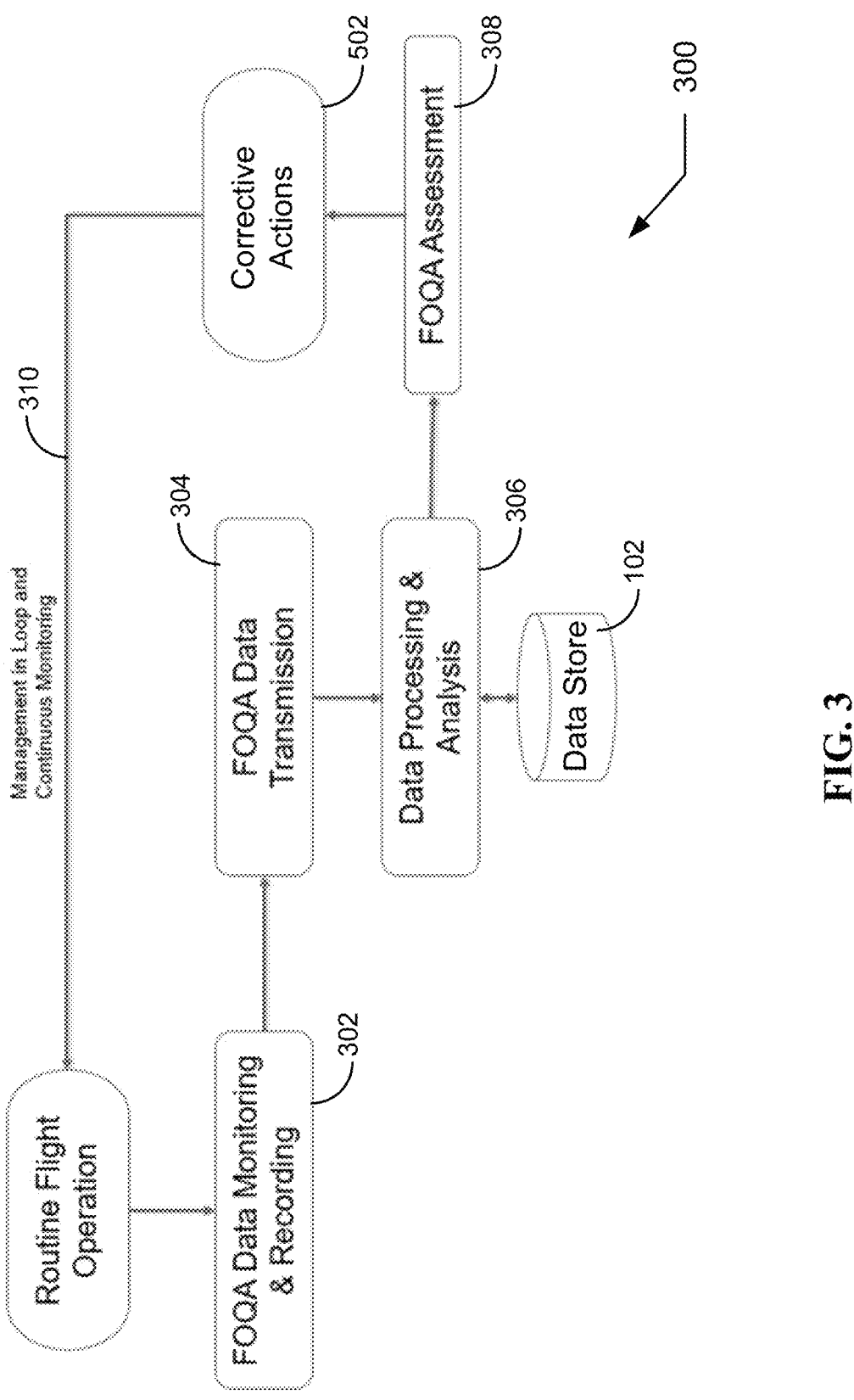

FIG. 3 illustrates a diagram of an example system architecture for generating corrective actions measures in an aerial vehicle context in accordance with at least some example embodiments of the present disclosure.

Figure 4:
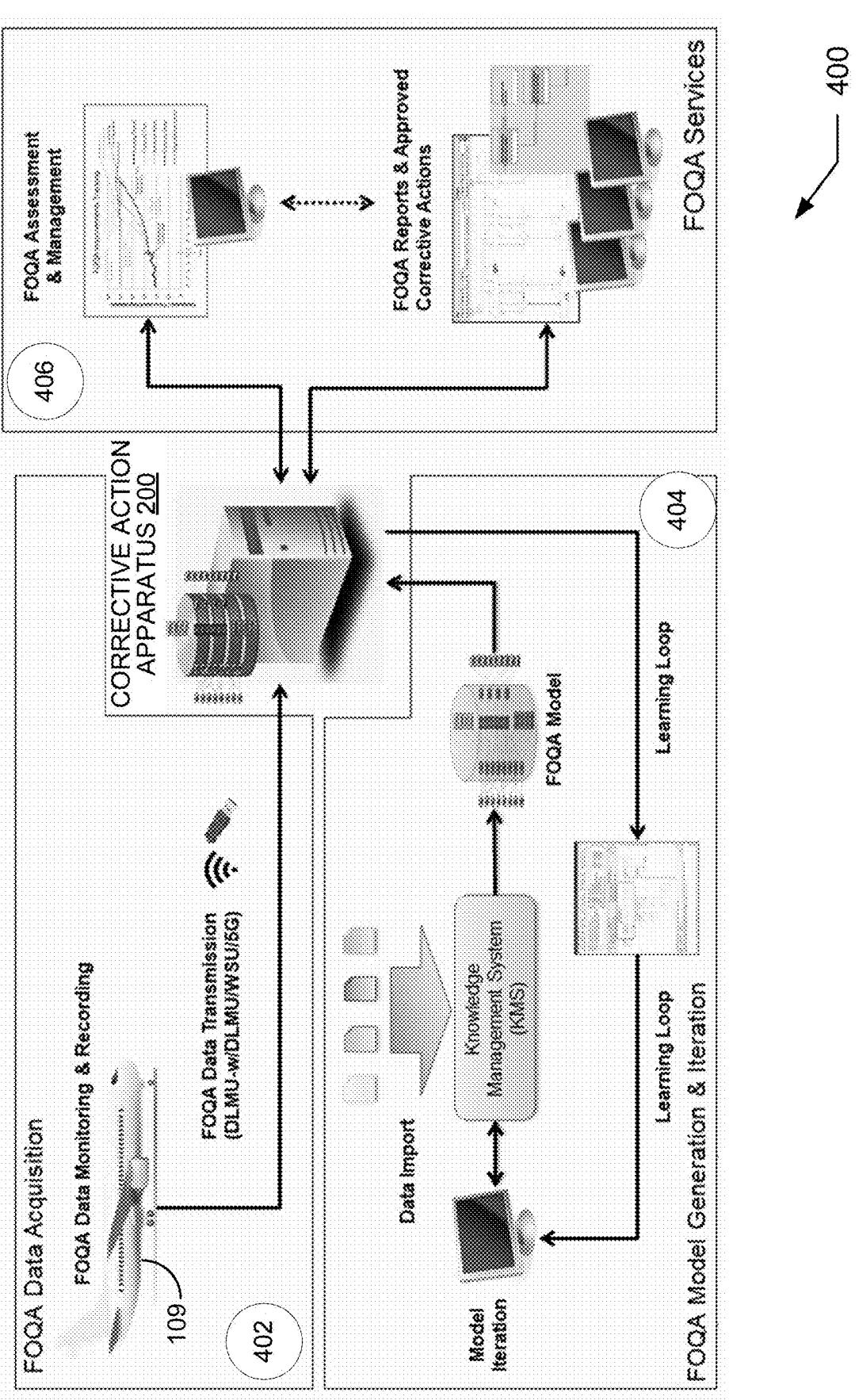

FIG. 4 illustrates a diagram of an example system architecture for generating corrective actions in an aerial vehicle context in accordance with at least some example embodiments of the present disclosure.

Figure 5:
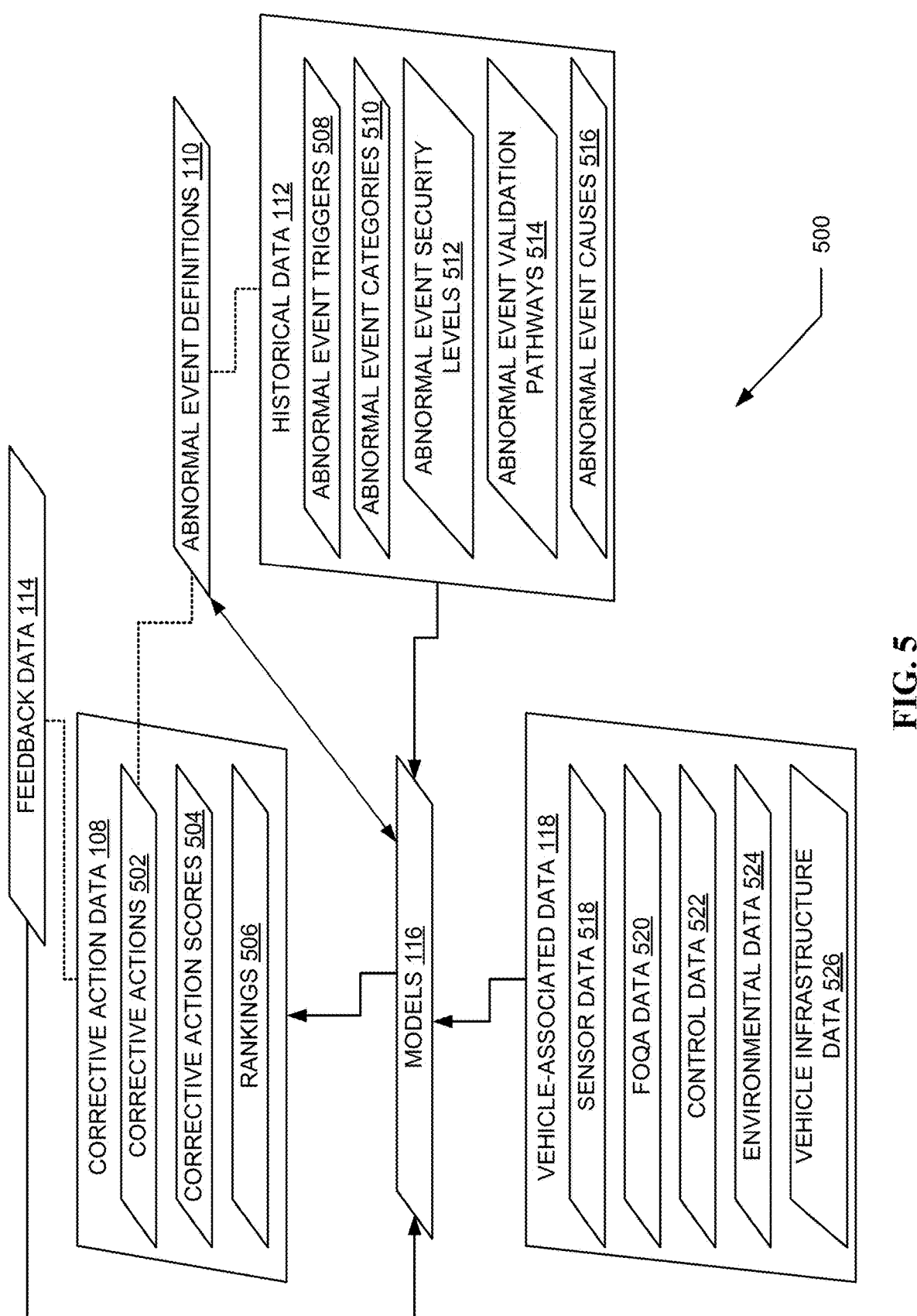

FIG. 5 illustrates an example data architecture in accordance with at least some example embodiments of the present disclosure.

Figure 6:
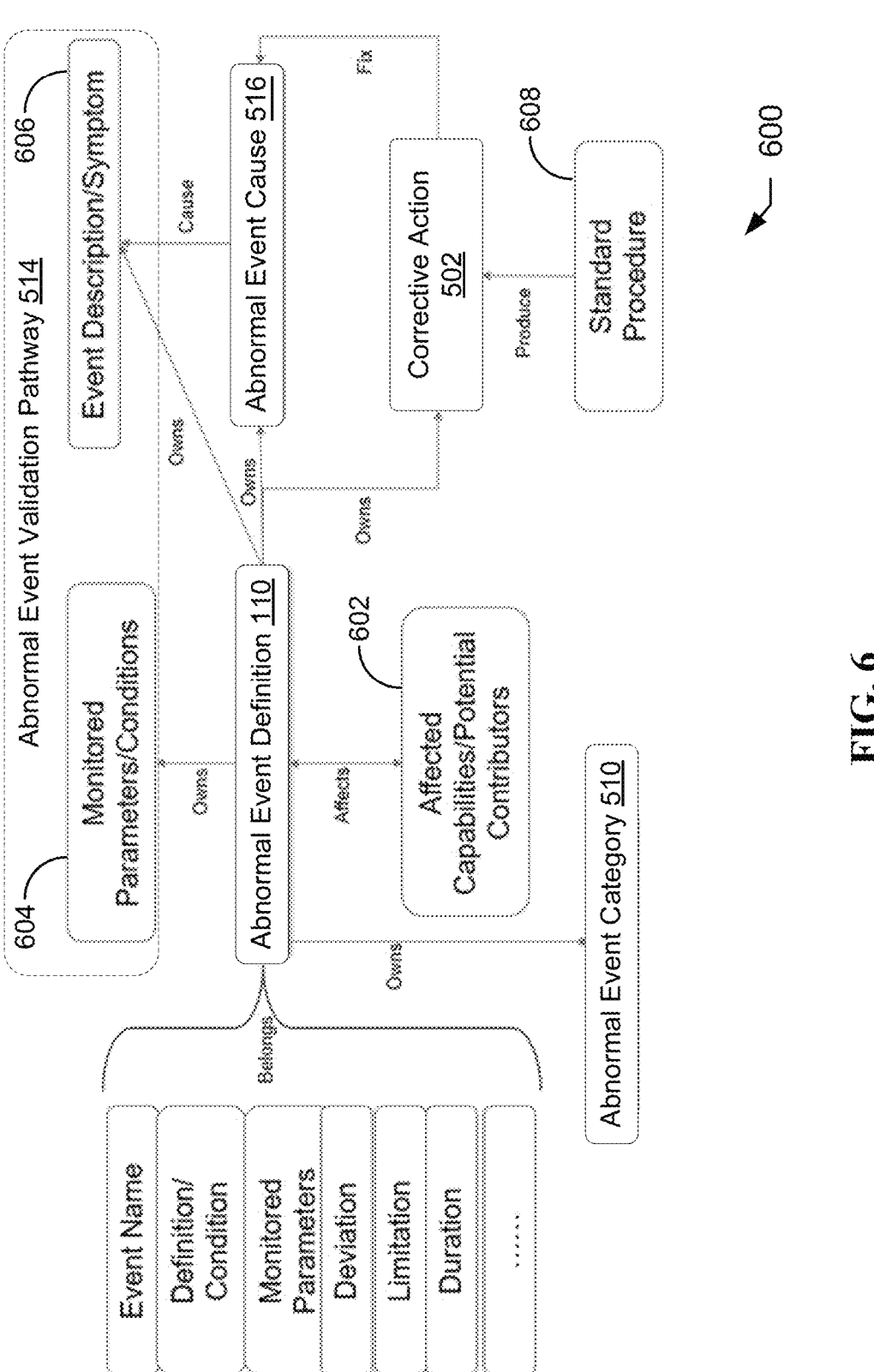

FIG. 6 illustrates a diagram of an example model architecture for generating corrective actions in accordance with at least some example embodiments of the present disclosure.

Figure 7:
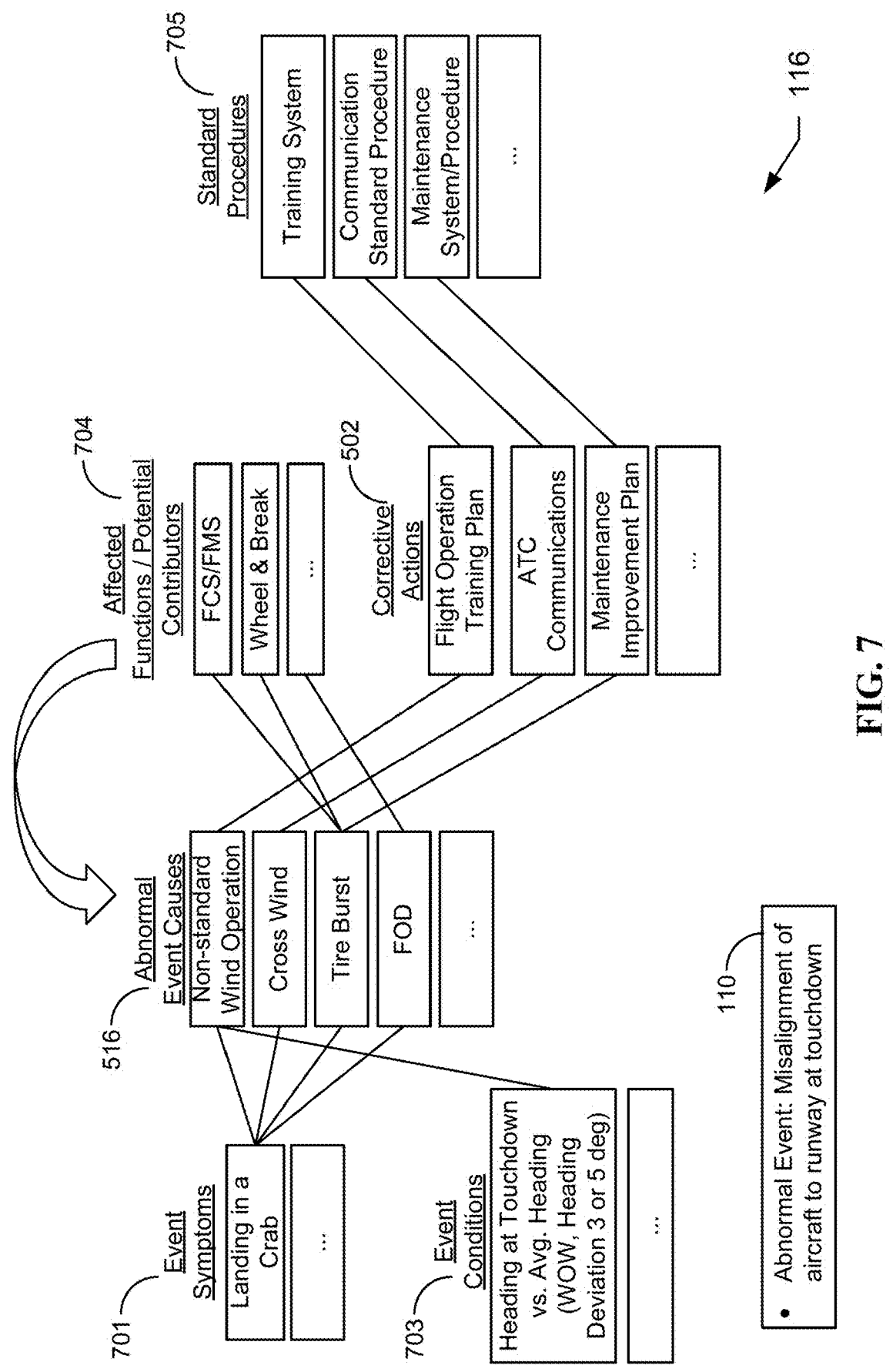

FIG. 7 illustrates a diagram of an example model for generating corrective actions in an aerial vehicle context in accordance with at least some example embodiments of the present disclosure.

Figure 8:
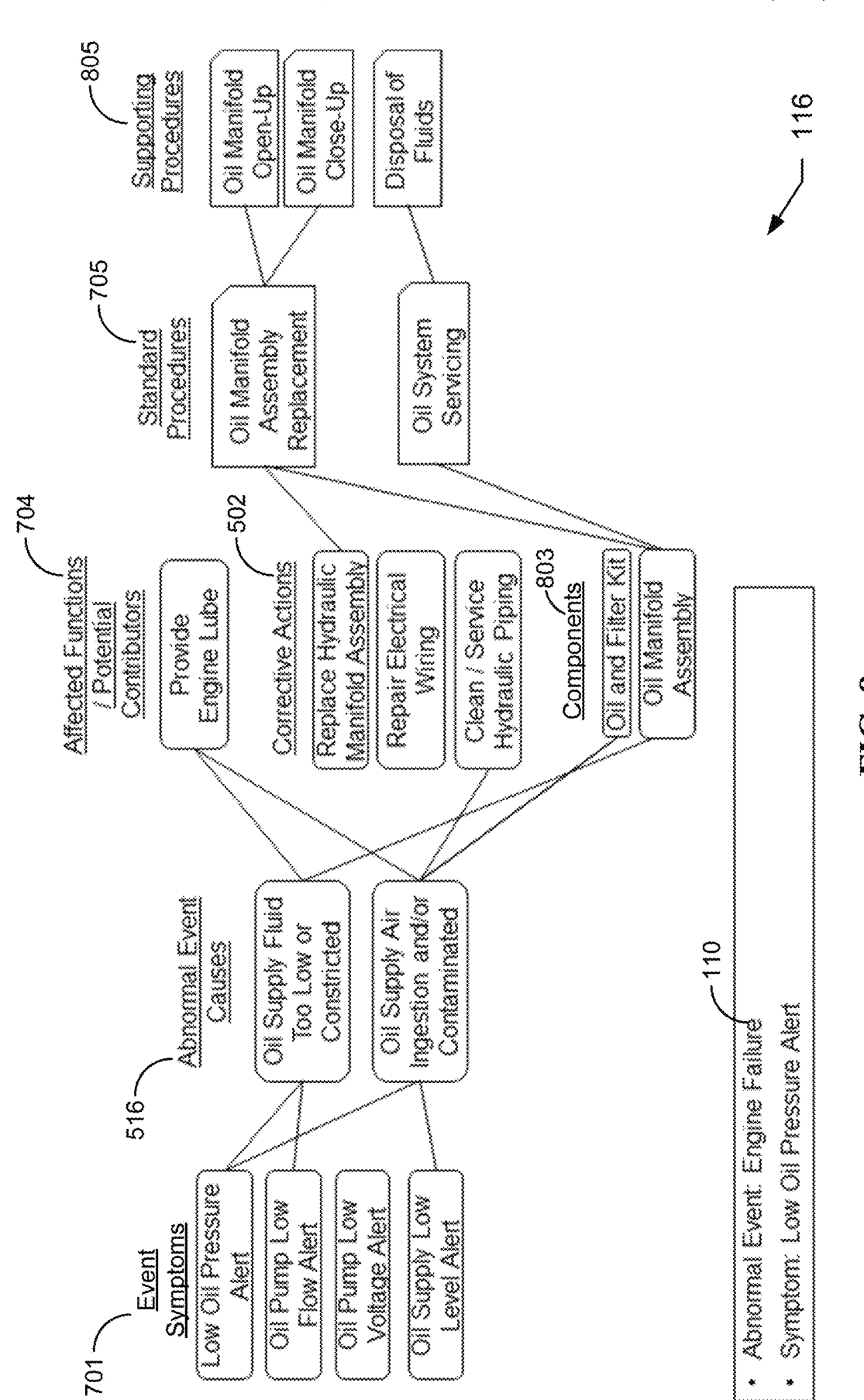

FIG. 8 illustrates a diagram of an example model for generating corrective actions in an aerial vehicle context in accordance with at least some example embodiments of the present disclosure.

Figure 9:
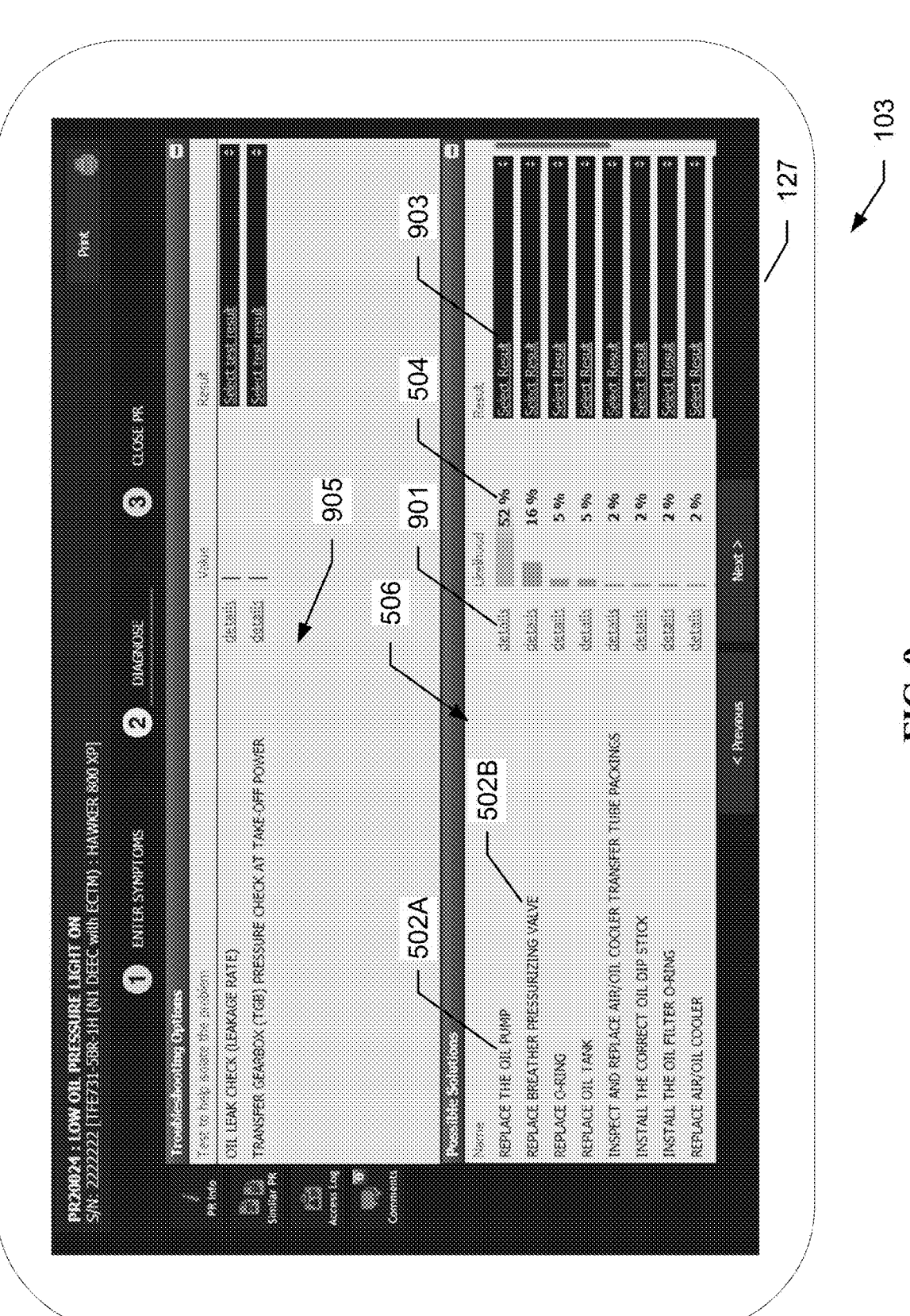

FIG. 9 shows a computing device including an example graphical user interface (GUI) for displaying corrective action data in accordance with at least some example embodiments of the present disclosure.

FIG. 10 illustrates a flowchart depicting operations of an example process for generating rankings of corrective actions in accordance with at least some example embodiments of the present disclosure.

DETAILED DESCRIPTION

Embodiments of the present disclosure now will be described more fully hereinafter with reference to the accompanying drawings, in which some, but not all, embodiments of the disclosure are shown. Indeed, embodiments of the disclosure may be embodied in many different forms and should not be construed as limited to the embodiments set forth herein, rather, these embodiments are provided so that this disclosure will satisfy applicable legal requirements. Like numbers refer to like elements throughout.

Overview

Embodiments of the present disclosure provide a myriad of technical advantages in the technical field of remediating abnormal events that occur in vehicle operation. In typical approaches to remediating abnormal events, vehicle-associated data and/or statistical analyses thereof are to vehicle operators or maintenance personnel who then determine a course of corrective action based on their personal assessment, expertise, and experience. Such approaches may fail to directly and efficiently provide accurate corrective actions, continuous improvement recommendations, and follow-ups. Further, reliance on personnel experience may reduce the scalability, accuracy, and/or efficiency of operations for mitigating abnormal events. In addition, existing approaches may demonstrate limited capability to iterate on and communicate best practices for remediating abnormal events. For example, existing approaches may fail to generate and/or communicate improvements to processes for correctly and efficiently remediating an abnormal event.

Embodiments of the present disclosure overcome these disadvantages by providing advanced safety analysis and actionable corrective actions for continuous improvement and optimization of vehicle operations. In some embodiments, the present methods, apparatuses, and computer program products automatically identify and monitor key indicators and conditions of abnormal events, perform root cause analysis of abnormal events, and generate corrective action recommendations. In doing so, the methods, apparatuses, and computer program products may improve the efficiency and accuracy of corrective measures for remediating abnormal events, which may improve vehicle safety and improve compliance with regulatory requirements. Further, the techniques described herein may provide for earlier identification of adverse safety trends that, if uncorrected, may result in additional abnormal events or escalation of event severity.

In an aerial vehicle context, the present methods, apparatuses, and computer program products may model abnormal events and generate corrective actions for improving flight safety and flight operational quality. In various embodiments, through selective automated recording and analysis of data generated during routine flight operations, the present techniques provide greater information about, and greater insight into, the total flight operations environment. For example, the present techniques may model abnormal events based at least in part on flight operational quality assurance (FOQA) data to identify situations that may require improved operating, training and maintenance procedures, practices, equipment, infrastructure, and/or the like. In some embodiments, based at least in part on models of abnormal events and other data related to a vehicle or vehicle operation, the present techniques generate corrective actions to remediate abnormal events quickly and efficiently. Existing approaches to addressing abnormal events in aerial vehicle operation may include data monitoring, recording, and statistical analysis functions. However, such approaches lack the capability to directly recommend corrective actions for improving safety risks associated with abnormal events.

In various embodiments, the present methods, apparatuses, and computer program products generate models configured to characterize an abnormal event, determine possible corrective actions for remediating the abnormal event, and generate respective corrective action scores that indicate a likelihood of the corrective action to mitigate, improve, or reduce one or more safety risks associated with the abnormal event. In some embodiments, to generate corrective actions and corrective action scores, the model processes various data related to the vehicle, abnormal event, possible corrective actions, and/or the like, including operational events, abnormal event triggers, abnormal event categories, abnormal event levels, abnormal event validation paths, potential root causes of abnormal events, and additional related operational data (e.g., weather conditions, conditions of vehicle-related infrastructure, and/or the like). For example, embodiments of the present disclosure may map an abnormal event to historical data and, in doing so, identify various relationships, causalities, impacts, and/or the like between the abnormal event and subsets of the historical data to enable prediction of optimal corrective actions based at least in part on the mappings.

In various embodiments, the present methods, apparatuses, and computer program products are embodied as a corrective action system. In some embodiments, the corrective action system is configured to automate abnormal event investigation based at least in part on one or more knowledge models. For example, in an aerial context, the corrective action system may automatically investigate root causes, symptoms, impacts, and/or the like of an abnormal event based at least in part on a model of FOQA data associated with the abnormal event and one or more aerial vehicles. In some embodiments, the corrective action system is configured to predict corrective actions for remediating an abnormal event. For example, the corrective action system may generate respective corrective action scores for a plurality of corrective actions. The corrective action system may rank or sort the plurality of corrective actions based on the respective corrective action scores. The corrective action system may output the corrective actions and corrective action scores to one or more computing devices associated with vehicle operators, maintenance personnel, vehicle operation administrators, and/or the like. In some embodiments, the corrective action system generates and outputs a ranking of the corrective actions based at least in part on the corrective actions scores. In doing so, the corrective action system may improve the efficiency of abnormal event remediation by indicating to vehicle stakeholders a corrective action that demonstrates the highest predicted likelihood of successfully resolving the abnormal event.

In some embodiments, the corrective action system includes one or more self-learning feedback loops that enable the system to update abnormal event modeling and corrective action score generation based at least in part on feedback to previous outputs of the corrective action system. In doing so, the corrective action system may continuously adapt and optimize operations for remediating abnormal events. In one example, the corrective action system may cause rendering of a graphical user interface (GUI) at a computing device, the GUI including a ranking of a plurality of corrective actions for remediating a predefined abnormal event, and the ranking being generated based on a respective corrective action scores from a model. The corrective action system may receive, from the computing device, feedback data indicating a successfulness of resolution associated with implementing one or more of the plurality of corrective actions. The corrective action system may update the model to improve a scoring of the predefined abnormal event based at least in part on the feedback data. In various embodiments, the updated model may be subsequently utilized by the corrective action system to generate updated rankings of corrected actions for remediating the predefined abnormal event.

Definitions

"Vehicle" refers to any apparatus that traverses throughout an environment by any mean of travel. In some contexts, a vehicle transports goods, persons, and/or the like, or traverses itself throughout an environment for any other purpose, by means of air, sea, or land. In some embodiments, a vehicle is ground-based, air-based, water-based, space-based (e.g., outer space or within an orbit of a planetary body, a natural satellite, or artificial satellite), and/or the like. In some embodiments, the vehicle is an aerial vehicle capable of air travel. Non-limiting examples of aerial vehicles include urban air mobility vehicles, drones, helicopters, fully autonomous air vehicles, semi-autonomous air vehicles, airplanes, orbital craft, spacecraft, and/or the like. In some embodiments, the vehicle is piloted by a human operator onboard the vehicle. For example, in an aerial context, the vehicle may be a commercial airliner operated by a flight crew. In some embodiments, the vehicle is remotely controllable such that a remote operator may initiate and direct movement of the vehicle. Additionally, in some embodiments, the vehicle is unmanned. For example, the vehicle may be a powered, aerial vehicle that does not carry a human operator and is piloted by a remote operator using a control station. In some embodiments, the vehicle is an aquatic vehicle capable of surface or subsurface travel through and/or atop a liquid medium (e.g., water, water-ammonia solution, other water mixtures, and/or the like). Non-limiting examples of aquatic vehicles include unmanned underwater vehicles (UUVs), surface watercraft (e.g., boats, jet skis, and/or the like), amphibious watercraft, hovercraft, hydrofoil craft, and/or the like. As used herein, vehicle may refer to vehicles associated with urban air mobility (UAM).

"Abnormal event" refers to any condition of a vehicle that deviates from an expected performance of the vehicle, reduces safety of operating the vehicle, or is associated with causing potential damage to the vehicle or others (e.g., vehicle infrastructure, vehicle operators, passengers, personnel or infrastructure external to the vehicle, and/or the like). In some embodiments, an abnormal event includes a vehicle experiencing a malfunction or failure of one or more components, systems, controls, and/or the like. For example, an abnormal event may include a vehicle experiencing engine failure. In some embodiments, an abnormal event includes deviation of vehicle performance from an expected condition, criteria, threshold, and/or the like. For example, in an aerial context, an abnormal event may include a vehicle landing at an unexpected heading or at a heading angle outside of a predetermined range. As another example, an abnormal event may include a vehicle experiencing a braking distance, turning radius, acceleration, and/or the like, outside of a predetermined range. Further non-limiting examples of abnormal events may include engine stalling, electrical failure, hydraulic failure, depressurization, component failure, control failure, landing gear failure, and/or the like.

"Corrective action" refers to any activity, task, operation, process, and/or the like that may be performed to remediate an abnormal event. In some embodiments, remediation of an abnormal event includes reducing, mitigating, or improving one or more safety risks associated with the abnormal event.

Additionally, or alternatively, in some embodiments, remediation of an abnormal event includes reducing a likelihood of the abnormal event to reoccur. In some embodiments, a corrective action includes repairing, replacing, and/or servicing one or more vehicle components. In one example, possible corrective actions for remediating an engine failure include replacing a hydraulic manifold assembly, repairing electrical wiring, servicing hydraulic piping, and/or the like. In some embodiments, a corrective action includes modifying vehicle operator behavior including modifying vehicle operation and/or maintenance procedures, prompting vehicle operators or maintenance personnel to review vehicle operation and/or maintenance procedures, adjusting communication processes, and/or the like. For example, possible corrective actions for remediating an adverse heading upon vehicle landing may include modifying or reviewing a vehicle operation training plan, modifying or reviewing a maintenance improvement plan, or increasing or improving communication between vehicle operators and a vehicle traffic system, environment monitoring system, and/or the like.

"Corrective action score" refers to any metric, category, and/or the like that may be assigned to a corrective action to indicate a likelihood of the corrective action to remediate an abnormal event. In some embodiments, a corrective action score indicates a likelihood that a corresponding corrective action will cause mitigate, improve, or reduce a safety risk of one or more abnormal events. For example, an abnormal event may embody an engine failure and possible corrective actions for the engine failure may include replacing an oil pump, replacing a breather pressurizing valve, replacing an o-ring, or replacing an oil tank. A respective corrective action score for each corrective action may embody a percentage value that indicates a likelihood that performance of the associated corrective action will reduce likelihood of the vehicle experiencing a recurrence of engine failure. In some embodiments, the percentage value is based on a model historical data and indicates the frequency of instances in which the associated action was performed and resulted in successful resolution of the abnormal event.

"Environment" refers to a physically-defined area. "Aerial environment" refers to an air-based environment. "Vehicle environment" refers to a physically-defined area within a vehicle.

"Model" refers to any algorithmic, statistical, and/or machine learning model that generates a particular output, or plurality thereof, based at least in part on one or more inputs. In some embodiments, a model is associated with a particular vehicle type, vehicle model, and/or the like. For example, in an aerial context, a first model may be associated with a first type of aircraft (e.g., Boeing 757) and a second model may be associated with a second type of aircraft (e.g., Airbus A321). In some embodiments, the model embodies a mapping of vehicle parameters, conditions, statuses, and/or the like to various categories of information associated with an abnormal event or the remediation of the abnormal event. For example, the model may map subsets of input data to a plurality of categories including event symptoms, abnormal event causes, affected functions and/or potential contributors, corrective actions, standard procedures, supporting procedures, and/or the like. Based at least in part on the mapping of the subsets of input data, the model may enable identification of corrective actions for remediating the abnormal event. In some embodiments, the model includes mappings of historical data to a plurality of categories associated with an abnormal event, including respective outcomes associated with performance of one or more corrective actions for remediating the abnormal event. In some embodiments, the model is configured to generate corrective action scores based at least in part on the mappings of historical data and historical corrective action outcomes. For example, based at least in part on historical data and mappings, the model may estimate the respective frequency and/or magnitude of successful abnormal event resolution for a plurality of corrective actions.

Example Systems and Apparatuses of the Disclosure

FIG. 1 illustrates a block diagram of a networked environment that may be specially configured within which embodiments of the present disclosure may operate. Specifically, FIG. 1 depicts an example networked environment 100. As illustrated, the networked environment 100 includes a corrective action system 101, one or more computing devices 103, one or more vehicles 109, one or more vehicle traffic systems 111, and one or more environment monitoring systems 113. In some embodiments, the corrective action system 101, computing device 103, vehicle 109, vehicle traffic systems 111, environment monitoring system 113, and/or the like, communicate via one or more networks 150.

In some embodiments, the corrective action system 101 is embodied as, or includes one or more of, a corrective action apparatus 200 (e.g., as further illustrated in FIG. 2 and described herein). Various applications and/or other functionality may be executed in the corrective action system 101 and/or corrective action apparatus 200 according to various embodiments. For example, the corrective action system 101 may perform the process 1000 as shown in FIG. 10 and described herein to generate rankings of corrective actions for remediating safety risks of an abnormal event. In some embodiments, the corrective action system 101 may generate models 116 based at least in part on the model architecture 600 shown in FIG. 6 and described herein. For example, the corrective action system 101 may generate a model 116 as shown in FIG. 7 or 8, respectively, and described herein. As another example, the corrective action system 101 may generate and cause rendering of graphical user interfaces (GUIs), such as the GUI 900 shown in FIG. 9 and described herein. In some embodiments, functions and operations of the corrective action apparatus 200 may be automatically invoked and executed in response to receipt of data associated with a vehicle, receipt of feedback data associated with implementation of a corrective action, and/or the like.

In some embodiments, the apparatus 200 includes one or more circuitries (e.g., physical, virtual, and/or the like) that intake and process data from other computing devices and systems including computing devices 103, vehicles 109, vehicle traffic systems 111, environment monitoring systems 113, and/or the like. In some embodiments, the apparatus 200 includes input/output circuitry that enables a computing device 103, vehicle 109, and/or the like, to provide input to and receive output from the apparatus 200. For example, the input/output circuitry may include or embody user interfaces, input devices, and/or the like for receiving input from and providing output to a computing device 103, vehicle 109, and/or the like.

In some embodiments, the apparatus 200 includes one or more circuitries or interfaces that communicate with computing devices 103, vehicles 109, vehicle traffic systems 111, environment monitoring systems 113, and/or the like. For example, the apparatus 200 may include a communication interface that enables communication between the apparatus 200 and a vehicle 109, computing device 103, and/or the like. In some embodiments, the apparatus 200 includes modeling circuitry configured for carrying out various functions described herein including establishing mappings between abnormal event definitions 110 and historical data 114, linking vehicle-associated data 118 to abnormal event definitions 110, generating respective corrective action scores for corrective actions associated with remediation of an abnormal event, and/or the like. In some embodiments, the modeling circuitry is configured to generate and execute models 116 that perform one or more of said functions. In some embodiments, the apparatus 200 generates rankings of corrective actions based at least in part on corrective action scores generated by a model 116. In some embodiments, the apparatus 200 causes rendering of a GUI 127 including the ranking on a display of a computing device 103. In some embodiments, the apparatus 200 receives feedback data 114 from a computing device 103 and updates one or more models 116 based at least in part on the feedback data 114. In some embodiments, the apparatus 200 generates updated rankings of corrective actions based at least in part on the updated model 116.

In some embodiments, the corrective action system 101 includes one or more data stores 102. The various data in the data store 102 may be accessible to one or more of the apparatus 200, the computing device 103, vehicle 109, and/or the like. The data store 102 may be representative of a plurality of data stores 102 as can be appreciated. The data stored in the data store 102, for example, is associated with the operation of the various applications, apparatuses, and/or functional entities described herein. The data stored in the data store 102 may include, for example, corrective action data 108, abnormal event definitions 110, historical data 112, feedback data 114, models 116, vehicle-associated data 118, and/or the like.

In some embodiments, the corrective action data 108 includes data that defines corrective actions for remediating safety risks associated with abnormal events. In some embodiments, the corrective action data 108 further includes corrective action scores indicative of predicted likelihood that the associated corrective action will remediate an abnormal event. In some embodiments, the corrective action data 108 includes one or more rankings of corrective actions based at least in part on respective corrective action score. In some embodiments, abnormal event definitions 110 include data that defines a plurality of abnormal events associated with vehicle operation. In some embodiments, an abnormal event definition 110 includes an identifier for an anomalous event, one or more criteria for determining occurrence of the anomalous event, and/or the like. In some embodiments, an abnormal event definition 110 includes mappings of an abnormal event to various historical data 112 that embodies symptoms, causes, validation pathways, categories, and/or the like associated with the anomalous event. In some embodiments, the historical data 112 includes data associated with historical vehicle operations including previous occurrences of one or more abnormal events.

In some embodiments, the feedback data 114 includes data indicative of a successfulness of resolution associated with implementation of a corrective action. In some embodiments, the feedback data 114 indicates whether one or more corrective actions were successful in mitigating, improving, or reducing a safety risk associated with a predefined abnormal event. In some embodiments, the models 116 include any algorithmic, statistical, and/or machine learning model that maps historical data 112 to abnormal event definitions 110, links vehicle-associated data 118 to one or more abnormal event definitions 110, generates corrective action data 108, and/or the like. Additional example aspects of the model 116 are further depicted in FIGS. 3-8 and described herein. In some embodiments, vehicle-associated data 118 includes any data associated with vehicle operation including vehicle control, vehicle performance, vehicle configuration, and/or the like. In some embodiments, vehicle-associated data 118 includes data associated with vehicle sensors, vehicle-related infrastructure, vehicle-related environments, and/or the like. In some embodiments, vehicle-associated data 118 includes identifying information for a vehicle including vehicle type, vehicle identifier (e.g., model, make, identification code, and/or the like), vehicle age, maintenance records, vehicle standards, regulations, and/or the like. Additional example aspects of the corrective action data 108, abnormal event definitions 110, historical data 112, feedback data 114, models 116, vehicle-associated data 118 are shown in the data architecture 500 depicted in FIG. 5 and described herein.

In some embodiments, the computing device 103 includes a personal computer, laptop, smartphone, tablet, workstation, work portal, Internet-of-Things enabled device, virtual assistant, and/or the like. In some embodiments, the computing device 103 provisions feedback data 114, vehicle-associated data 118, and/or the like to the corrective action system 101. In some embodiments, the computing device 103 provides user inputs to the apparatus 200, vehicle 109, vehicle traffic system 111, and/or the like. In some embodiments, the user inputs embody feedback data 114, vehicle-associated data 118, and/or the like. Additionally, or alternatively, in some embodiments, the user inputs include an approval or disapproval to perform one or more corrective actions. For example, a computing device 103 may be associated with a vehicle administrator, owner, manager, and/or the like responsible for controlling vehicle operations including maintenance, training, and/or the like. The corrective action system 101 may provide a ranking of corrective actions to the computing device 103 for review and approval, where approval may cause the corrective action system 101 to provision the ranking to a second computing device 103 associated with vehicle operators, maintenance personnel, and/or the like. In some embodiments, the computing device 103 renders graphical user interfaces (GUIs) 127. For example, the computing device 103 may render a GUI 127 including a ranking of corrective actions, such as the GUI 900 shown in FIG. 9 and described herein.

In some embodiments, the computing device 103 includes include one or more displays 123 on which GUIs 127 and other information related to vehicle operation quality assurance may be rendered. In some embodiments, a display 123 includes a CRT (cathode ray tube), LCD (liquid crystal display) monitor, LED (light-emitting diode) monitor, and/or the like, for displaying information/data to an operator of the computing device 103. In some embodiments, the computing device 103 includes one or more input devices 125 for receiving user inputs. For example, the input device 125 may receive user inputs that indicate a successfulness of resolution associated with implementation of a corrective action. In another example, the input device 125 may receive inputs requesting additional information associated with a corrective action, such as standard procedures, support procedures, components, and/or the like. The input device 125 may include any number of devices that enable human-machine interface (HMI) between a user and the computing device 103. In some embodiments, the input device 125 includes one or more buttons, cursor devices, joysticks, touch screens, including three-dimensional or pressure-based touch screens, camera, finger-print scanners, accelerometer, retinal scanner, gyroscope, magnetometer, or other input devices.

In some embodiments, the vehicle 109 includes one or more vehicle recording systems 115, one or more sensors 117, one or more controls 119, one or more input devices 121, and/or the like. In some embodiments, the vehicle recording system 115 refers to any system embodied in hardware, software, firmware, and/or any combination thereof, that obtains and stores data associated with a vehicle 109. In some embodiments, the vehicle recording system 115 acquires and captures vehicle-associated data 118 during operation of the vehicle 109. For example, in an aerial context, the vehicle recording system 115 may embody aircraft data input sources and equipment for recording and storing associated data. In some embodiments, a vehicle recording system 115 receives (or generates) and records in storage media data from one or more sensors, monitoring systems, controls, and/or the like of a vehicle. In some embodiments, a vehicle recording system 115 embodies a flight data recorder (FDR), cockpit voice recorder (CVR), aircraft condition monitoring system (ACMS), central maintenance computer system (CMCS), flight data management automated system (FDMAS), aircraft data gateway (ADG), flight data acquisition unit (FDAU), data management unit (DMU), triggered and continuous recording function (TCRF) and/or the like. In some embodiments, a vehicle recording system 115 includes or is in communication with means for wirelessly provisioning vehicle-associated data to the corrective action system. In some embodiments, a vehicle recording system 115 may include (or be connected to) a transmitter that provides satellite uplink and downlink capabilities to enable the corrective action system to obtain vehicle-associated data 118.

In some embodiments, the sensor 117 generates readings indicative of one or more vehicle conditions, statuses, operating parameters, and/or the like. In some embodiments, the sensor 117 generates readings indicative of abnormal event systems. For example, a sensor 117 may detect changes in oil pressure, oil flow, oil supply, equipment voltage, and/or the like. In an aerial context, a sensor 117 may embody an onboard sensor configured to measure one or more aspects of aircraft operation, such as aircraft pitch, heading, airspeed, groundspeed, altitude, ascent/descent rate, equipment statuses, control inputs, and/or the like.

In some embodiments, the controls 119 include any devices, instruments, inputs, and/or the like that are associated with controlling operation of a vehicle. For example, a control 119 may include a control wheel, brake pedal, throttle, flight surface controller (e.g., flaps, elevators, ailerons, rudders, and/or the like), landing gear controller, and/or the like. In some embodiments a control 119 embodies an input device 121. In some embodiments, the vehicle recording system 115 monitors manipulation of and/or states or statuses of one or more controls (e.g., throttle level, brake position, flap position, and/or the like). In some embodiments, an input device 121 includes any device configured to receive user inputs for controlling and/or providing data associated with a vehicle 109. Non-limiting examples of input devices include buttons, cursor devices, joysticks, touch screens, including three-dimensional or pressure-based touch screens, camera, finger-print scanners, accelerometer, retinal scanner, gyroscope, magnetometer, or other input devices.

In some embodiments, the vehicle traffic system 111 includes any number of computing device(s) and/or other system(s) embodied in hardware, software, firmware, and/or the like that monitor vehicle traffic and vehicle infrastructure within an area. For example, the vehicle traffic system 111 may embody an air traffic controller (ATC) that monitors movement of aircraft within a region of airspace, conditions of aircraft runways, schedules of aircraft landings and departures, and/or the like. In some embodiments, the vehicle traffic system 111 includes one or more radar systems that generate data indicative of one or more aspects of vehicle operation including vehicle location, airspeed, groundspeed, ascent rate, descent rate, acceleration, altitude, heading, and/or the like. In some embodiments, the vehicle traffic system 111 generates vehicle infrastructure data including conditions of landing sites (e.g., traffic density, precipitation levels, debris prevalence, and/or the like).

In some embodiments, the environment monitoring system 113 includes any system embodied in hardware, software, firmware, and/or any combination thereof, that obtains data indicative of one or more conditions of an environment. In some embodiments, an environment monitoring system 113 embodies a weather system that generates information indicative of a previous, current, or future state of weather respective to an environment. For example, the environment monitoring system 113 may generate indications of storms, precipitation (e.g., rain, fog, snow, hail, and/or the like), strong winds, and/or the like that have occurred, are occurring, or may occur at a particular location. In some embodiments, the environment monitoring system 113 includes one or more sensors that generates readings indicative of environmental conditions. For example, based at least in part on readings from one or more sensors, the environment monitoring system 113 may generate measurements indicative of wind speed, wind direction, temperature, humidity, pressure, visibility, and/or the like.

In some embodiments, the apparatus 200, computing device 103, vehicle 109, vehicle traffic system 111, and/or environment monitoring system 113, are communicable over one or more communications network(s), for example the communications network(s) 150. It should be appreciated that the communications network 150 in some embodiments is embodied in any of a myriad of network configurations. In some embodiments, the communications network 150 embodies a public network (e.g., the Internet). In some embodiments, the communications network 150 embodies a private network (e.g., an internal, localized, and/or closed-off network between particular devices). In some other embodiments, the communications network 150 embodies a hybrid network (e.g., a network enabling internal communications between particular connected devices and external communications with other devices). In some embodiments, the communications network 150 embodies a satellite-based communication network. Additionally, or alternatively, in some embodiments, the communications network 150 embodies a radio-based communication network that enables communication between the apparatus 200 and the computing device 103, vehicle 109, vehicle traffic system 111, environment monitoring system 113, and/or the like. For example, the vehicle 109 may provision vehicle-associated data to the apparatus 200 via a transponder, communication gateway, and/or the like. The communications network 150 in some embodiments may include one or more transponders, satellites, base station(s), relay(s), router(s), switch(es), cell tower(s), communications cable(s) and/or associated routing station(s), and/or the like. In some embodiments, the communications network 150 includes one or more user-controlled computing device(s) (e.g., a user owner router and/or modem) and/or one or more external utility devices (e.g., Internet service provider communication tower(s) and/or other device(s)).

Each of the components of the system communicatively coupled to transmit data to and/or receive data from one another over the same or different wireless or wired networks embodying the communications network 150. Such configuration(s) include, without limitation, a wired or wireless Personal Area Network (PAN), Local Area Network (LAN), Metropolitan Area Network (MAN), Wide Area Network (WAN), satellite network, radio network, and/or the like. Additionally, while FIG. 1 illustrate certain system entities as separate, standalone entities communicating over the communications network 150, the various embodiments are not limited to this particular architecture. In other embodiments, one or more computing entities share one or more components, hardware, and/or the like, or otherwise are embodied by a single computing device such that connection(s) between the computing entities are over the communications network 150 are altered and/or rendered unnecessary.

FIG. 2 illustrates a block diagram of an example apparatus 200 that may be specially configured in accordance with at least some example embodiments of the present disclosure. The apparatus 200 may carry out functionality and processes described herein to establish mappings between historical data and abnormal event definitions, link data associated with a vehicle to one or more abnormal event definitions, generate respective corrective action scores for corrective actions associated with remediating an abnormal event, and/or the like. In some embodiments, the apparatus 200 includes a processor 201, memory 203, communications circuitry 205, input/output circuitry 207, data processing circuitry 209, and modeling circuitry 212. In some embodiments, the apparatus 200 is configured, using one or more of the processor 201, memory 203, communications circuitry 205, input/output circuitry 207, data processing circuitry 209, and/or modeling circuitry 212 to execute and perform the operations described herein.

In general, the terms computing entity (or "entity" in reference other than to a user), device, system, and/or similar words used herein interchangeably may refer to, for example, one or more computers, computing entities, desktop computers, mobile phones, tablets, phablets, notebooks, laptops, distributed systems, items/devices, terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Such functions, operations, and/or processes may include, for example, transmitting, receiving, operating on, controlling, modifying, restoring, processing, displaying, storing, determining, creating/generating, monitoring, evaluating, comparing, and/or similar terms used herein interchangeably. In one embodiment, these functions, operations, and/or processes may be performed on data, content, information, and/or similar terms used herein interchangeably. In this regard, the apparatus 200 embodies a particular, specially configured computing entity transformed to enable the specific operations described herein and provide the specific advantages associated therewith, as described herein.

Although components are described with respect to functional limitations, it should be understood that the particular implementations necessarily include the use of particular computing hardware. It should also be understood that in some embodiments certain of the components described herein include similar or common hardware. For example, in some embodiments two sets of circuitry both leverage use of the same processor(s), network interface(s), storage medium(s), and/or the like, to perform their associated functions, such that duplicate hardware is not required for each set of circuitry. The use of the term "circuitry" as used herein with respect to components of the apparatuses described herein should therefore be understood to include particular hardware configured to perform the functions associated with the particular circuitry as described herein.

Particularly, the term "circuitry" should be understood broadly to include hardware and, in some embodiments, software for configuring the hardware. For example, in some embodiments, "circuitry" includes processing circuitry, storage media, network interfaces, input/output devices, and/or the like. Additionally, or alternatively, in some embodiments, other elements of the apparatus 200 provide or supplement the functionality of another particular set of circuitry. For example, the processor 201 in some embodiments provides processing functionality to any of the sets of circuitry, the memory 203 provides storage functionality to any of the sets of circuitry, the communications circuitry 205 provides network interface functionality to any of the sets of circuitry, and/or the like.

In some embodiments, the processor 201 (and/or co-processor or any other processing circuitry assisting or otherwise associated with the processor) is/are in communication with the memory 203 via a bus for passing information among components of the apparatus 200. In some embodiments, for example, the memory 203 is non-transitory and may include, for example, one or more volatile and/or non-volatile memories. In other words, for example, the memory 203 in some embodiments includes or embodies an electronic storage device (e.g., a computer readable storage medium). In some embodiments, the memory 203 is configured to store information, data, content, applications, instructions, or the like, for enabling the apparatus 200 to carry out various functions in accordance with example embodiments of the present disclosure (e.g., establishing mappings between historical data and abnormal event definitions, linking data associated with a vehicle to an abnormal event definition, generating rankings of corrective actions for remediating an abnormal event, and/or the like). In some embodiments, the memory 203 is embodied as a data store 102 as shown in FIG. 1 and described herein. In some embodiments, the memory 203 includes corrective action data 108, abnormal event definitions 110, historical data 112, feedback data 114, models 116, vehicle-associated data 118, and/or the like, as further architected in FIG. 5 and described herein.

The processor 201 may be embodied in a number of different ways. For example, in some embodiments, the processor 201 includes one or more processing devices configured to perform independently. Additionally, or alternatively, in some embodiments, the processor 201 includes one or more processor(s) configured in tandem via a bus to enable independent execution of instructions, pipelining, and/or multithreading. The use of the terms "processor" and "processing circuitry" should be understood to include a single core processor, a multi-core processor, multiple processors internal to the apparatus 200, and/or one or more remote or "cloud" processor(s) external to the apparatus 200.

In an example embodiment, the processor 201 is configured to execute instructions stored in the memory 203 or otherwise accessible to the processor. Additionally, or alternatively, the processor 201 in some embodiments is configured to execute hard-coded functionality. As such, whether configured by hardware or software methods, or by a combination thereof, the processor 201 represents an entity (e.g., physically embodied in circuitry) capable of performing operations according to an embodiment of the present disclosure while configured accordingly. Additionally, or alternatively, as another example in some example embodiments, when the processor 201 is embodied as an executor of software instructions, the instructions specifically configure the processor 201 to perform the algorithms embodied in the specific operations described herein when such instructions are executed.

As one particular example embodiment, the processor 201 is configured to perform various operations associated with linking vehicle-associated data to one or more abnormal event definitions. In some embodiments, the processor 201 includes hardware, software, firmware, and/or the like, that generates models configured to establish mappings between historical data and an abnormal event definition, link vehicle-associated data to the abnormal event definition, predict corrective actions for remediating the abnormal event in the context of the vehicle-associated data, and/or the like. In some embodiments, the apparatus 200 includes input/output circuitry 207 that provides output to a computing device 103 and, in some embodiments, receives an indication of a user input. For example, in some contexts, the input/output circuitry 207 provides output to and receives input from a computing device 103 of a vehicle operator, vehicle maintenance personnel, vehicle administrator, and/or the like. The input may include approval or disapproval to perform a corrective action. Alternatively, or additionally, the input may include feedback indicative of a level of successfulness of remediating a safety risk of an abnormal event based at least in part on implementation of a corrective action.

In some embodiments, the input/output circuitry 207 is in communication with the processor 201 to provide such functionality. The input/output circuitry 207 may comprise one or more user interface(s) and in some embodiments includes a display that comprises the interface(s) rendered as a web user interface, an application user interface, a user device, a backend system, or the like. In some embodiments, the input/output circuitry 207 also includes a keyboard, a mouse, a joystick, a touch screen, touch areas, soft keys a microphone, a speaker, and/or other input/output mechanisms. The processor 201 and/or input/output circuitry 207 comprising the processor may be configured to control one or more functions of one or more user interface elements through computer program instructions (e.g., software and/or firmware) stored on a memory accessible to the processor 201 (e.g., memory 203, data store 102, and/or the like). In some embodiments, the input/output circuitry 207 includes or utilizes a user-facing application to provide input/output functionality to a display of a computing device 103, vehicle 109, and/or other display associated with a vehicle operator, maintenance personnel, administrator, and/or the like.

In some embodiments, the apparatus 200 includes communications circuitry 205. The communications circuitry 205 includes any means such as a device or circuitry embodied in either hardware or a combination of hardware and software that is configured to receive and/or transmit data from/to a network and/or any other device, circuitry, or module in communication with the apparatus 200. In this regard, in some embodiments the communications circuitry 205 includes, for example, a network interface for enabling communications with a wired or wireless communications network, such as the network 150 shown in FIG. 1 and described herein. Additionally, or alternatively in some embodiments, the communications circuitry 205 includes one or more network interface card(s), antenna(s), bus(es), switch(es), router(s), modem(s), and supporting hardware, firmware, and/or software, or any other device suitable for enabling communications via one or more communications network(s). Additionally, or alternatively, the communications circuitry 205 includes circuitry for interacting with the antenna(s) and/or other hardware or software to cause transmission of signals via the antenna(s) or to handle receipt of signals received via the antenna(s). In some embodiments, the communications circuitry 205 enables transmission to and/or receipt of data from computing devices 103, vehicles 109, vehicle traffic systems 111, environment monitoring systems 113, and/or other external computing devices in communication with the apparatus 200.

The data processing circuitry 209 includes hardware, software, firmware, and/or a combination thereof, that obtain and process corrective action data, abnormal event definitions, historical data, feedback data, vehicle-associated data, and/or the like. For example, in some contexts, the data processing circuitry 209 includes hardware, software, firmware, and/or the like, that process data associated with vehicle to link the data to one or more abnormal event definitions or aspects thereof, such as abnormal event symptoms, conditions, descriptions, causes affected capabilities, and/or the like. In some embodiments, the data processing circuitry 209 includes hardware, software, firmware, and/or the like, that generate abnormal event definitions. For example, in response to a failure to link data associated with a vehicle to existing abnormal event definitions, the data processing circuitry 209 may generate a data object indicative of a new abnormal event based at least in part on the data associated with the vehicle. In some embodiments, the data processing circuitry 209 includes hardware, software, firmware, and/or the like, that determine environment data, vehicle infrastructure data, and/or the like that is associated with operation of a vehicle. For example, the data processing circuitry 209 may obtain a set of environmental data including weather conditions along a travel pathway. The data processing circuitry 209 may determine a subset of the environment data that is associated with navigation of a vehicle along the travel pathway. As another example, the data processing circuitry 209 may determine a subset of vehicle infrastructure data that is associated with conditions of a particular runway upon which an aerial vehicle performed a takeoff or landing operation. In some embodiments, the data processing circuitry 209 includes a separate processor, specially configured field programmable gate array (FPGA), and/or a specially programmed application specific integrated circuit (ASIC).

The modeling circuitry 212 includes hardware, software, firmware, and/or a combination thereof, that generate and execute models for establishing mappings between historical data and abnormal event definitions, linking data associated with a vehicle to one or more abnormal event definitions, generate respective corrective action scores for corrective actions associated with remediating an abnormal event, and/or the like. For example, in some contexts, the modeling circuitry 212 includes hardware, software, firmware, and/or the like, that execute a model configured to map an abnormal event to one or more abnormal event triggers, categories, security levels, validation pathways, causes, and/or the like that are represented in historical data. In some embodiments, the modeling circuitry 212 includes hardware, software, firmware, and/or the like, that execute a model configured to link data associated with a vehicle to one or more abnormal event definitions. For example, the modeling circuitry 212 may determine respective similarities, linkages, and/or the like between data associated with a vehicle and event triggers, categories, security levels, validation pathways, causes, and/or the like that are mapped to an abnormal event.

In some embodiments, the modeling circuitry 212 includes hardware, software, firmware, and/or the like, that generate respective corrective action scores for a plurality of corrective actions associated with remediating an abnormal event. For example, based at least in part on data associated with a vehicle and a linked abnormal event definition, the modeling circuitry 212 may generate a corrective action score for each of a plurality of corrective actions, where each corrective action score indicates a likelihood that a corresponding corrective action will mitigate, improvement, or reduce one or more safety risks associated with the defined abnormal event. In some embodiments, the modeling circuitry 212 includes hardware, software, firmware, and/or the like, that update models based at least in part on feedback data such that the updated models may generate more accurate corrective action scores and rankings. In some embodiments, the modeling circuitry 212 includes a separate processor, specially configured field programmable gate array (FPGA), and/or a specially programmed application specific integrated circuit (ASIC).

Additionally, or alternatively, in some embodiments, two or more of the processor 201, memory 203, communications circuitry 205, input/output circuitry 207, data processing circuitry 209, and/or modeling circuitry 212 are combinable. Additionally, or alternatively, in some embodiments, one or more of the sets of circuitry perform some or all of the functionality described associated with another component. For example, in some embodiments, two or more of the sets of circuitry 201-212 are combined into a single module embodied in hardware, software, firmware, and/or a combination thereof. Similarly, in some embodiments, one or more of the sets of circuitry, for example the memory 203, communication interface 205, data processing circuitry 209, and/or modeling circuitry 212 is/are combined with the processor 201, such that the processor 201 performs one or more of the operations described above with respect to each of these sets of circuitry 203-212.

FIG. 3 illustrates a diagram of an example system architecture 300 for generating corrective actions measures in an aerial vehicle context in accordance with at least some example embodiments of the present disclosure. In some embodiments, the system architecture 300 is embodied by the corrective action system 101 shown in FIG. 1 and described herein. In some embodiments, functionality of the system architecture 300 is performed by a corrective action apparatus 200 as described herein. In some embodiments, the system architecture 300 includes means for monitoring and recording flight operation quality assurance (FOQA) data associated with routine operation of flights via one or more aerial vehicles (indicium 302). For example, the apparatus 200 may receive and store FOQA data associated with routine flight operations of a plurality of aircraft. The apparatus 200 may generate a knowledge base including recorded occurrences of abnormal events, implementations of corrective actions for remediating abnormal events, and feedback data indicative of successfulness of resolution in implementing corrective actions. In some embodiments, the FOQA data is stored at one or more data stores 102. In some embodiments, the knowledge base is embodied by a data store 102.

In some embodiments, the system architecture 300 includes means for transmitting (or otherwise causing provision of) FOQA data to a computing environment for processing and analysis (indicium 304). In some embodiments, the system architecture 300 includes means for processing and analysis of FOQA data (indicium 306). For example, the apparatus 200 may process and analyze FOQA data to link the FOQA data to one or more abnormal event definitions, associate the FOQA data with aspects of abnormal events (e.g., symptoms, conditions, causes, contributors, affected functions, and/or the like), corrective action outcomes, and/or the like.

In some embodiments, the system architecture 300 includes means for assessing the FOQA data and generating one or more corrective actions 502 based at least in part on the assessment (indicium 308). In some embodiments, the system architecture 300 provides means for identifying or recognizing the proper corrective actions (e.g., repairs, trainings, improvement measures, follow-ups, and/or the like) to ensure effective remediation of unsafe conditions associated with abnormal events. In existing approaches, FOQA data may be monitored, recorded, and statistically analyzed to detect historical abnormal event occurrences and vehicle trends. However, such approaches fail to directly or efficiently provide accurate corrective actions, continuous improvement recommendations, and follow-ups that may improve remediation of abnormal events. For example, existing approaches may present FOQA data to experienced personnel (e.g., pilots, maintenance teams, and/or the like) and further remediation of abnormal events may be reliant upon individual experience levels of such personnel. In various embodiments, the corrective action system described herein (and as further architected as shown in FIG. 4) overcomes the deficiencies of existing approaches by providing advanced safety analysis and actionable corrective actions for continuous improvement of flight operations such that effective remediation of abnormal events is less reliant upon personal experience.

In various embodiments, the system architecture 300 includes means for continuous monitoring of flight operations following implementation of one or more corrective actions 502 (indicium 310). Additionally, or alternatively, in some embodiments, the system architecture 300 includes means for provisioning corrective action recommendations to one or more administrators for evaluation and approval. For example, the apparatus 200 may generate a corrective action for remediating an abnormal event based at least in part on an assessment of FOQA data. The apparatus 200 may provision the corrective action to a computing device associated with an administrator or manager of a vehicle for approval. In response to receiving approval from the computing device, the apparatus 200 may provision the corrective action to one or more computing devices of operators, maintenance personnel, and/or the like that are associated with the vehicle and implementation of the corrective action.

FIG. 4 illustrates a diagram of an example system architecture 400 for generating corrective actions in an aerial vehicle context in accordance with at least some example embodiments of the present disclosure. In some embodiments, the system architecture 400 shows functionality embodied by a corrective action apparatus 200 as described herein.

In some embodiments, in an aerial context, the apparatus 200 is configured to perform functionality including FOQA data acquisition (indicium 402), FOQA model generation and iteration (404), and FOQA services 406). In some embodiments, to perform FOQA data acquisition, the apparatus 200 includes means for monitoring and recording FOQA data from one or more vehicles 109. In one example, the apparatus 200 receives FOQA data from one or more airborne recording and/or monitoring systems, such as a flight data recorder (FDR), cockpit voice recorder (CVR), aircraft condition monitoring system (ACMS), central maintenance computer system (CMCS), flight data management automated system (FDMAS), aircraft data gateway (ADG), flight data acquisition unit (FDAU), data management unit (DMU), triggered and continuous recording function (TCRF) and/or the like. In some embodiments, the FOQA data is obtained from one or more onboard sensors that measure aspects of vehicle operation. In some embodiments, the apparatus 200 receives the data buses and interfaces. In some embodiments, the apparatus 200 receives and processes the FOQA data while the vehicle 109 is in motion (e.g., in-air). Alternatively, or additionally, in some embodiments, the apparatus 200 receives the FOQA data while the vehicle 109 is immobile and/or located at a particular ground-based waypoint, such as a runway, vehicle station, and/or the like. In doing so, the apparatus 200 may significantly improve data processing efficiency and reduce costs of transmitting data while the vehicle is in motion. In some embodiments the apparatus 200 receives real-time streams of data from an aircraft condition monitoring system, and/or the like.

In some embodiments, to perform FOQA model generation and iteration, the apparatus 200 includes means for importing and/or inputting FOQA data and other data associated with the vehicle. For example, the apparatus 200 may import and/or input operational events and the associated event triggers/category/level/validation path, potential root causes, related corrective actions, additional related operational data source such as weather, runway information, industry best practices, regulatory requirements, and/or the like. In some embodiments, the apparatus 200 includes a knowledge management system (KMS) configured to import FOQA data and generate a knowledge base of data associated with the vehicle 109. In some embodiments, the apparatus 200 includes means for generating and executing FOQA models (e.g., models 116 as described herein and shown in FIGS. 1, 7, and 8 and described herein) to link the FOQA data to abnormal event definitions and generate corrective action scores and corrective action rankings for remediating abnormal events. In some embodiments, the apparatus 200 includes means for executing learning loops to continuously update and iterate upon FOQA models based at least in part on feedback data associated with implementation of corrective actions. In doing so, the apparatus 200 may integrate knowledge and experiences from multiple personnel, time periods, vehicle conditions, and/or the like. Such techniques may overcome technical challenges of existing approaches to remediating abnormal events, such as the siloing and centralization of knowledge and experience to individual personnel. Further, by providing corrective action scores and rankings of corrective actions, the apparatus 200 may improve efficiency and accuracy of operations for remediating abnormal events.

In some embodiments, to perform FOQA services, the apparatus 200 includes means for reporting and obtaining approval of corrective actions. For example, the apparatus 200 may provision a ranking of corrective actions and/or respective corrective actions scores to a computing device of a vehicle manager, owner, administrator, and/or the like. The apparatus 200 may receive from the computing device an approval or disapproval for implementation of one or more corrective actions. In some embodiments, in response to receiving approval, the apparatus 200 may cause provision of the corrective action ranking and/or one or more top-ranked corrective actions to a computing device associated with a vehicle operator, crewmember, maintenance team member, and/or the like, for implementation. In some embodiments, the apparatus 200 generates FOQA reports indicative of FOQA data, one or more anomalous events linked to the FOQA data, one or more corrective action scores, corrective action rankings, and/or the like. The apparatus 200 may provide the FOQA report to computing devices associated with vehicle owners, vehicle administrators, vehicle managers, vehicle operators, maintenance personnel, and/or the like. In some embodiments, the FOQA report includes an updated ranking of corrective actions for remediating an abnormal event such that the apparatus 200 continuously informs vehicle stakeholders of the corrective actions predicted to yield the greatest likelihood of success in remediating safety risks associated with abnormal events.

In some embodiments, the apparatus 200 performs FOQA assessment and management services on behalf of a first type of user that is associated with reviewing FOQA reports, reviewing corrective action rankings, and tracking continuous improvement for vehicle operations. In some embodiments, the apparatus 200 enables users of the first type to approve and deliver corrective action rankings (e.g., or entries thereof) to a second type of user that is associated with implementing the corrective action. In some embodiments, the apparatus 200 enables the second type of user to provide feedback data indicative of successfulness of resolution in implementing corrective actions. For example, the apparatus 200 may cause rendering of a GUI on a computing device of the second type of user, where the GUI includes fields for receiving feedback respective to implementation of a corrective action. In some embodiments, the apparatus 200 updates FOQA models based at least in part on the feedback data to optimize model performance. In some embodiments, the first type of user embodies a vehicle owner, administrator, manager, and/or the like. In some embodiments, the second type of user embodies a vehicle operator (e.g., pilot, crewmember, and/or the like), vehicle maintenance personnel, and/or the like.

Example Data Architectures and Models of the Disclosure

Having described example systems and apparatuses in accordance with embodiments of the present disclosure, example architectures of data and workflows in accordance with the present disclosure will now be discussed. In some embodiments, the systems and/or apparatuses described herein maintain data environment(s) that enable the workflows in accordance with the data architectures described herein. For example, in some embodiments, the systems and/or apparatuses described herein function in accordance with the data architectures depicted and described herein with respect to FIG. 5 and the models depicted and described herein with respect to FIGS. 6-8 are performed or maintained via the apparatus 200.

FIG. 5. illustrates an example data architecture 500 in accordance with at least some example embodiments of the present disclosure. In some embodiments, the corrective action data 108 includes corrective actions 502, corrective action scores 504, rankings 506, and/or the like. In various embodiments, a corrective action refers to any action, process, training, and/or the like that may be implemented to remediate an abnormal event. In some embodiments, corrective actions 502 are associated with one or more abnormal event definitions 110. For example, a corrective action 502 may include replacing a hydraulic manifold assembly and may be associated with an abnormal event definition for engine failure. In another example, a corrective action 502 may include repairing electrical wiring and may be associated with a first abnormal event definition for engine failure and a second abnormal event definition for instrument panel failure. In still another example, a corrective action 502 may include training with a flight operation training plan and may associated with an abnormal event definition for misalignment of an aircraft to a runway at touchdown. In some embodiments, a corrective action includes or is associated with one or more standard procedures, supporting procedures, components, and/or the like that are associated with implementing the corrective action.

In some embodiments, a corrective action score 504 embodies any metric or category that may be assigned to a corrective action to indicate a likelihood that (or magnitude to which) implementation of the corrective action will remediate an abnormal event. In some embodiments, the corrective action data 108 includes historical corrective action scores 504 for a respective corrective action 502. In some embodiments, a corrective action score 504 is associated with an iteration of a model 116 that generated the corrective action score. For example, the corrective action score 504 may include metadata including an identifier for a particular model 116 that generated the corrective action score. In some embodiments, the corrective action score 504 includes metadata including a timestamp at which the corrective action score was generated, an identifier for an abnormal event definition associated with the corrective action score, an identifier for the corrective action 502 associated with the corrective action score, and/or the like.

In some embodiments, the rankings 506 include listings of corrective actions 502 for remediating an abnormal event, where an ordering of the corrective actions in the listing is based at least in part on respective corrective action scores 504 for each corrective action. For example, a top-ranked entry of a ranking 506 may indicate a corrective action 502 associated with a highest corrective action score 504 respective to the corrective action scores 504 of other corrective actions for remediating an abnormal event. The top-ranked entry may further indicate a corrective action predicted to demonstrate the greatest likelihood of success in remediating an abnormal event when implemented. In some embodiments, the ranking 506 includes metadata including an identifier for an iteration of a model 116 that generated the ranking. In some embodiments, the metadata further includes a timestamp associated with generation of the ranking, identifiers for corrective actions and an abnormal event associated with the ranking, an identifier for a vehicle associated with the ranking, and/or the like. In some embodiments, the ranking is associated with an identifier such that feedback data received for one or more corrective actions may be subsequently associated with the ranking.

In some embodiments, the model 116 maps each abnormal event definition 110 to a subset of historical data 112. For example, a model 116 may establish mappings between an abnormal event definition 110 and a subset of historical data 112 associated with operation of one or more vehicles. In various embodiments, the model 116 may utilize the mappings between abnormal event definitions and historical data to link data associated with a vehicle to one or more abnormal event definitions. For example, the model 116 may associate the data associated with the vehicle to subsets of historical data and link the data to a particular abnormal event definition based at least in part on the associations and aforementioned mappings.

In some embodiments, the historical data 112 includes abnormal event triggers 508, abnormal event categories 510, abnormal event security levels 512, abnormal event validation pathways 514, abnormal event causes 516, and/or the like. In some embodiments, the abnormal event triggers 508 include vehicle-related alerts, conditions, reports, observations, and/or the like that are associated with detection of an abnormal event. For example, an abnormal event trigger 508 may include an observation or report that a vehicle landed in a crab. As another example, an abnormal event trigger 508 may include a low oil pressure alert, oil pump low flow alert, oil pump low voltage alert, oil supply low level alert, and/or the like. In another example, an abnormal event trigger 508 may include a condition of vehicle touchdown, such as an indication that the vehicle touched down to a runway at an angle of deviation greater than a threshold value (e.g., 3 degrees, 5 degrees, or another suitable value). In some embodiments, the abnormal event trigger 508 includes one or more thresholds or other criteria by which an abnormal event may be determined to have occurred.

In some embodiments, an abnormal event category 510 indicates a classification with which an abnormal event is associated. For example, an abnormal event category 510 may include component failure, system failure, vehicle control, communication failure, inspection failure, and/or the like. In some embodiments, an abnormal event category 510 includes an area of operational interest. For example, an abnormal event category 510 may include aircraft type, phase of flight, geographical location, and/or the like. In some embodiments, abnormal event security level 512 is a classification of vehicle operation that indicates a level of deviation from an established norm, threshold range, or other criteria. For example, an abnormal event definition may include an unexpected change in vehicle bank angle. Historical data associated with the abnormal event definition may include multiple security levels 512 associated with various ranges of bank angle (e.g., less than 30 degrees, 30-45 degrees, less than 60 degrees, greater than 60 degrees, or other suitable values). In some embodiments, an abnormal event validation pathway 514 includes any analytical-, statistical-, and/or rules-based process by which vehicle operation may be determined to be a valid sample of operation outside of an established norm. For example, an abnormal event validation pathway 514 may include one or more criteria for determining whether a vehicle operation (e.g., as represented by data associated with the vehicle) may be linked to an abnormal event definition. In some embodiments, an event validation pathway 514 includes one or more steps for validating readings from one or more sensors or other systems configured to monitor vehicle operations.

In some embodiments, an abnormal event cause 516 includes a root event, action, and/or the like that resulted in occurrence of an abnormal event. For example, an abnormal event may include engine failure and abnormal event causes associated with the abnormal event may include low or constricted oil supply fluid or oil supply air ingestion or contamination. As another example, an abnormal event definition may include misalignment between a vehicle and a runway at touchdown and abnormal event causes may include operating a vehicle in a non-standard wind condition, encountering a cross wind, experiencing a tire burst, encountering foreign object debris (FOD), and/or the like.

In some embodiments, vehicle-associated data 118 includes sensors data 518, FOQA data 520, control data 522, environmental data 524, vehicle infrastructure data 526, and/or the like. In some embodiments, sensor data 518 includes readings from one or more sensors 117. For example, sensor data 518 may include altitude, ground speed, airspeed, calibrated airspeed (CAS), exhaust gas temperature (EGT), gross weight, pitch, height above touch-down (HAT), heading, roll, vertical acceleration, oil pressure, oil pump flow, oil pump voltage, oil supply level, fuel level, and/or the like. In some embodiments, sensor data 518 includes metadata including a timestamp at which the data was generated, a location of the vehicle at time of measurement, identifiers for the sensor or system that generated the data, and/or the like. In some embodiments, FOQA data 520 includes digital flight data that has been collected from a vehicle or obtained from other systems that monitor the vehicle. For example, FOQA data 520 may include an approved travel pathway for a vehicle, such as a flight path, and a true travel pathway associated with operation of the vehicle along the travel pathway (e.g., including travel pathway deviations). As another example, FOQA data 520 may include component or system alerts that are triggered during operation of a vehicle, such as engine failure, excess bank angle, low/high airspeed on approach, and/or the like. In another example, FOQA data 520 may include conditions experienced by a vehicle or its occupants including hard landings, collisions, near-collisions, loss of or injury to vehicle occupants or cargo, and/or the like. In another example, FOQA data 520 may include radar-based observations of vehicle operation, such as vehicle position, speed, acceleration, orientation, and/or the like.

In some embodiments, control data 522 includes data associated with vehicle commands or maneuvers performed by a vehicle including control inputs, statuses, changes, and/or the like. For example, control data 522 may include commands, control inputs, and/or the like for configuring vehicle components or behaviors, such as flaps, brakes, landing gear, rudders, ailerons, elevators, engines, electrical systems, communication systems, and/or the like. In another example, in an aerial context, control data 522 may include data associated with vehicle maneuvers performed during aerial vehicle takeoff or landing, such as vehicle pitch, descent rate, ascent rate, or relative orientation to runways or other ground infrastructure. In some embodiments, control data 522 includes communications between vehicle operators and additional entities including operators of vehicle traffic systems, vehicle maintenance personnel, passengers, vehicle crewmembers, and/or the like. For example, control data 522 may include recordings of commands provided by vehicle traffic systems to one or more vehicle operators. As another example, control data 522 may include vehicle inspection reports, maintenance records, checklists, and/or the like.

In some embodiments, environmental data 524 includes data associated with an area external to a vehicle. For example, environmental data 524 may include atmospheric conditions associated with a vehicle, such as pressure, temperature, humidity, and/or the like. In some embodiments, environmental data 524 includes weather conditions including icing, convection, turbulence, pilot report (PIREP) information, meteorological aerodrome reports (METAR), terminal area forecasts (TAFs), airman's meteorological information (AIRMET), significant meteorological hazards (SIGMETs), precipitation data (e.g., rain, snow, sleet, hail, and/or the like), storms, and/or the like. In some embodiments, environmental data 524 includes current or historical wind conditions including wind speed, wind direction, wind scale information, headwind data, crosswind data, tailwind data, and/or the like.

In some embodiments, vehicle infrastructure data 526 includes data associated with infrastructure related to vehicle operation including vehicle landing sites, vehicle control stations, vehicle traffic monitoring stations, ports of entry, and/or the like. In some embodiments, vehicle landing sites include runways, helipads, vertiports, parking areas, and/or the like. In some embodiments, vehicle infrastructure data 526 includes conditions of vehicle infrastructure including wind, moisture, debris, and/or the like. For example, vehicle infrastructure data 526 may include levels of ice, snow, sleet, fog, or other precipitation along a runway. In some embodiments, vehicle infrastructure data 526 includes one or more ground traffic conditions including indications of vehicle traffic density at a landing site, availability to utilize a landing site, availability of fuel, maintenance, or other resources at a landing site, and/or the like. For example, vehicle infrastructure data 526 may indicate a queuing time associated with a runway, a current quantity of vehicles in the queue, and/or the like. As another example, vehicle infrastructure data 526 may include indications of hazardous or emergency conditions at a landing site, such as fire, smoke, flooding, wind, and/or the like.

In some embodiments, a model 116 generates corrective action scores 504 based at least in part on abnormal event definitions 110, historical data 112, and vehicle-associated data 118. For example, the model 116 may establish mappings between one or more abnormal event definitions 110 and subsets of historical data 112 such that the model may associate the abnormal event definition 110 with historical abnormal event triggers 508, abnormal event categories, 510, abnormal event security levels 512, abnormal event validation pathways 514, abnormal event causes 516, and/or the like. The model 116 may utilize the respective mappings to process and link vehicle-associated data 118 to one or more abnormal event definitions 110. For example, the model 116 may determine a respective similarity between vehicle-associated data 118 and abnormal event triggers, categories, security levels, validation pathways, and/or causes for one or more abnormal event definitions. Based at least in part on the respective similarities, the model 116 may determine one or more abnormal event definitions 110 that are met by the vehicle-associated data 118. The model 116 may generate corrective action scores 504 based at least in part on the vehicle-associated data 118 and one or more matched abnormal event definitions 110. Based at least in part on the corrective action scores, 504, the model 116 may generate a ranking of corresponding corrective actions 502 for remediating the abnormal event associated with the abnormal event definition.

FIG. 6 illustrates a diagram of an example model architecture 600 for generating corrective actions in accordance with at least some example embodiments of the present disclosure. In some embodiments, a model 116 (as shown in FIGS. 1, 5, 7, and 8 and described herein) embodies the model architecture 600. In some embodiments, the model architecture 600 is associated with one or more abnormal events, each of which may be represented by a respective abnormal event definition 110. In some embodiments, for a respective abnormal event definition 110, the model architecture 600 includes an event name, event conditions, one or more monitored parameters, threshold deviations for the parameters, one or more threshold limitations for the parameters, one or more threshold durations for the parameters, and/or the like. In some embodiments, a condition defines a property, status, instance, and/or the like of vehicle operation that may indicate occurrence of an abnormal event. As one example, a condition for an abnormal event of engine failure may include loss of power to one or more engines (e.g., where such loss of power may be detected and reported by the vehicle to the corrective action system). In another example, in an aerial context, a condition for an abnormal event of misalignment between an aerial vehicle and a runway may include the aerial vehicle landing in a crab.

In some embodiments, the monitored parameters include data associated with a vehicle that may be monitored to detect occurrence of an abnormal event. For example, monitored parameters may include one or more types of vehicle-associated data 118 as shown in FIG. 5 and described herein. In one example, monitored parameters for engine failure may include engine power, thrust, fuel consumption, exhaust emission. As another example, a monitored parameter for misalignment at touchdown may include vehicle heading. In some embodiments, deviation includes a delta or other difference between one or more vehicle operations as compared to a typical or predefined vehicle operation norm. For example, a deviation may include a delta between a threshold range of vehicle alignment to a runway at touchdown (e.g., 3 degrees, 5 degrees, or another suitable value) and a measured heading of the vehicle at touchdown. As another example, a deviation may include a value of difference between a current bank angle of an aerial vehicle and a predefined bank angle that is representative of operational norms, regulations, and/or the like.

In some embodiments, a limitation includes any threshold value, range, safety factor, or other criteria that defines expected, safe, typical, or other desired operation of a vehicle. For example, a limitation may include a threshold range of bank angle at one or more locations along a travel pathway of a vehicle. As another example, a limitation may include a threshold value of engine thrust, oil pressure, brake position, flap position, and/or the like. In some embodiments, a duration includes a time interval, frequency interval, and/or the like that is associated with one or more aspects of vehicle operation. For example, in an aerial context, a duration may include a threshold time interval of excess engine power while on the ground. As another example, a duration may include a threshold time interval of excess exhaust gas temperature (EGT).

In some embodiments, the model architecture 600 associates an abnormal event (represented as an abnormal event definition 110) with one or more affected capabilities and/or potential contributors 602. In some embodiments, an affected capability includes an impact to one or more aspects of vehicle operation that may result from an abnormal event and/or event symptom. For example, a misaligned heading at touchdown may be caused by a tire burst, which may affect wheel integrity and braking capability of the vehicle. As another example, an electrical failure may affect vehicle maneuvering and/or communication capabilities. In some embodiments, a potential contributor includes one or more aspects of vehicle operation that may precipitate an abnormal event or contribute to an abnormal event cause 516. For example, a potential contributor to misaligned heading at touchdown may include one or more vehicle commands or maneuvers during or preceding touchdown. As another example, a potential contributor to engine failure may include engine lube provided to one or more engines of a vehicle.

In some embodiments, the model architecture 600 associates an abnormal event definition 110 with one or more abnormal event validation pathways 514. In some embodiments, an abnormal event validation pathway includes one or more monitored parameters and/or conditions 604, one or more event descriptions and/or symptoms 606, and/or the like. In some embodiments, a monitored parameter or condition 604 embodies criteria by which occurrence of an abnormal event may be detected. For example, a monitored parameter may include a bank angle, ascent rate, descent rate, airspeed, ground speed, engine power, EGT, brake position, flap position, and/or the like. As another example, a condition may include loss of engine power, reduced braking capability, brake failure, landing gear failure, communication disruption or failure, instrument panel failure, and/or the like. In some embodiments, an event description or symptom 606 indicates vehicle operational states, vehicle performances, and/or the like that may be associated with an abnormal event such that detection of the event description or symptom may be utilized as a factor for determining occurrence of an abnormal event. For example, an abnormal event of engine failure may be associated with symptoms including low oil pressure alerts, oil pump low flow alert, oil pump low voltage alert, oil supply low level art, and/or the like. As another example, misalignment of vehicle heading at touchdown may be associated with an event definition of landing in a crab.

In various embodiments, the model architecture 600 associates an abnormal event definition 110 with one or more abnormal event causes 516. For example, an abnormal event definition 110 may be associated with a plurality of abnormal event causes 516, and each abnormal event cause may be associated with a different corrective action 502 and/or influence a successfulness of resolution of implementing the corrective action 502. For example, an abnormal event of engine failure may be associated with a first abnormal event cause of low or constricted oil supply or a second abnormal event cause of oil supply air congestion or contamination. As another example, a misaligned heading at touchdown may be associated with a plurality of abnormal event causes of non-standard wind operation, operation in crosswind conditions, a tire burst, or foreign object debris (FOD) encounters.

In some embodiments, the model architecture 600 associates an abnormal event definition 110 with one or more corrective actions 502 for remediating the abnormal event. Each corrective action 502 may demonstrate a varying level of likelihood to remediate the abnormal event based at least in part upon event symptoms, event causes, and vehicle-associated data associated with a particular occurrence of an abnormal event. For example, a corrective action of retraining vehicle operators may be more optimal for remediating a heading misalignment event in an instance where the event was caused by non-standard operation during wind conditions. Alternatively, when the misaligned heading is caused by a tire burst, a corrective action of implementing a maintenance improvement plan may be more optimal for remediating the abnormal event. In various embodiments, the corrective action system shown in the figures and described herein utilizes the model architecture 600 to link data associated with a vehicle to one or more abnormal event definitions and generate respective corrective action scores for corrective actions most likely to remediate safety risks associated with the predefined abnormal event.

In some embodiments, the model architecture 600 associates a corrective action 502 with one or more standard procedures 608. For example, a corrective action of replacing a hydraulic manifold assembly may be associated with a standard procedure for oil manifold assembly replacement. As another example, a corrective action of cleaning and servicing hydraulic piping may be associated with a standard procedure for oil system servicing. Additionally, the model architecture 600 may associate a corrective action 502 and/or standard procedure 608 with one or more support procedures, vehicle components, vehicle maintenance personnel, vehicle operators, and/or the like.

FIG. 7 illustrates a diagram of an example model 116 for generating corrective actions in an aerial vehicle context. In some embodiments, the model 116 is associated with one or more abnormal event definitions 110. For example, the model 116 shown in FIG. 7 may be associated with an abnormal definition including detection of a failure to align an aircraft to a runway at a point of touchdown when landing the aircraft. In some embodiments, the models 116 associates one or more symptoms 701, event conditions 703, and/or the like, with one or more abnormal event causes 516. In some embodiments, the model 116 obtains or generates the event symptoms 701, event conditions 703, and/or the like based at least in part on data associated with a vehicle 109. For example, based at least in part on data associated with a vehicle 109, the model 116 may generate or obtain an event symptom that indicates the vehicle 109 landed in a crab orientation. As another example, the model 116 may generate an event condition that indicates a heading of the vehicle 109 at touchdown demonstrated a deviation from an average heading at touchdown.

In some embodiments, the model 116 generates one or more abnormal event causes 516 (and/or links between causes, symptoms, conditions, and/or the like) based at least in part on data associated with the vehicle 109, historical data, and/or the like. The abnormal event cause 516 may embody a potential cause of the abnormal event. For example, the model 116 may associate the event symptoms, event conditions, and/or the like with non-standard wind operation, cross winds, tire bursts, foreign object debris (FOD) encounter, and/or the like. In some embodiments, the model 116 associates one or more affected functions and/or potential contributors 704 with one or more abnormal event causes 516. For example, the model 116 may associate a tire burst with an affected function including a flight control system (FCS) or flight monitoring system (FMS). As another example, the model 116 may associate a FOD encounter with an affected function including a wheel and brake. The model 116 may generate or obtain an affected function, potential contributor, and/or the like based at least in part on historical data, data associated with the vehicle that experienced the abnormal event, and/or the like. In some embodiments, the model 116 includes one or more knowledge bases comprising historical associations between event symptoms, event conditions, abnormal event causes, historical affected functions, potential contributors, and/or the like. The model 116 may use the knowledge base to perform lookup functions and/or the like to link data associated with a vehicle with one or more abnormal event causes, historical affected functions, potential contributors, and/or the like. Alternatively, or additionally, in some embodiments, the model 116 may include one or more corpuses of historical abnormal event reports, resolutions, documentation, and/or the like. The model 116 may link data associated with a vehicle to an abnormal event definition, symptom, condition, cause, affected function, potential contributor, and/or the like, at least in part by applying one or more natural language recognition processes, similarity scoring techniques, and/or the like to the corpus and the data associated with the vehicle.

In various embodiments, the model 116 includes and/or generates associations between abnormal event causes 516 and corrective actions 502. For example, the model 116 may associate vehicle operation in a non-standard wind condition to a corrective action including training vehicle operators using a flight operation training plan. As another example, the model 116 may associate a cross wind encounter with adjustments to communication with one or more vehicle traffic systems, such as an air traffic controller (ATC). In another example, the model 116 may associate a tire burst event with implementation of or retraining on a maintenance improvement plan. In some embodiments, the model 116 links data associated with a vehicle to an abnormal event cause 516. In some embodiments, based at least in part on the linkage, the model 116 generates a corrective action score for a corrective action 502 that is associated with the abnormal event cause 516.

In some embodiments, the model 116 includes and/or generates associations between corrective actions 502 and standard procedures 705. A standard procedure 705 may embody a category of corrective action. For example, a corrective action embodying a flight operation training plan may be associated with a standard procedure of "Training System." As another example, a corrective action embodying adjustment to ACT communication may be associated with "Communication Standard Procedure." In another example, a maintenance improvement plan for addressing an abnormal event cause of "tire burst" may be associated with "Maintenance System/Procedure." In some embodiments, based at least in part on the standard procedure, the model 116 may generate an indication of one or more personnel, components, supporting procedures, and/or the like that are associated with performance of a corrective action.

FIG. 8 illustrates a diagram of an example model 116 for generating corrective actions in an aerial vehicle context. In various embodiments, the model 116 shown in FIG. 8 is associated with an abnormal event definition 110 embodying an engine failure. In some embodiments, the model 116 includes a plurality of event symptoms 701 associated with the abnormal event definition. For example, the model 116 may include symptoms of engine failure including low oil pressure alert, oil pump low flow alert, oil pump low voltage alert, oil supply low level alert, and/or the like. In some embodiments, the model 116 includes respective associations between abnormal event causes 516 and event symptoms 701. For example, the model 116 may include an association between low or constricted oil supply and a low oil pressure alert, oil pump low flow alert, and/or the like. As another example, the model 116 may include an association between an oil supply air ingestion and/or contamination and a low oil pressure alert, oil supply low level alert, and/or the like.

In some embodiments, the model 116 includes one or more affected functions and/or potential contributors 704 that are associated with the abnormal event being defined and/or the one or more abnormal event causes. For example, the model 116 may include providing engine lube as a potential affected function and/or contributing factor of an oil supply fluid being low or constricted and/or oil supply air ingestion or contamination. In some embodiments, the model 116 includes a plurality of potential corrective actions 502 associated with reducing a safety risk associated with the abnormal event. For example, the model 116 may include corrective actions including replacing a hydraulic manifold assembly, repairing electrical wiring, and cleaning and servicing hydraulic piping. In some embodiments, the model 116 includes historical data indicative of combinations of model elements that are associated with implementation of particular corrective actions and a successfulness of implementing the corrective action in remediating the abnormal event. In some embodiments, the model 116 links data associated with a vehicle to elements of the abnormal event definition as expressed within the model elements.

In some embodiments, the model 116 generates a corrective action score for a corrective action based at least in part on determining a degree to which the data associated with the vehicle matches or otherwise demonstrates congruity or similarity to historical data that is associated with successful implementation of a corrective action. For example, in response to the data including a low oil pressure alert and an oil supply low level alert, the model 116 may link the data to an oil supply air ingestion and/or contamination. Based at least in part on the linkage, the model 116 may generate a first corrective action score for replacing a hydraulic manifold assembly, a second corrective action score for repairing electrical wiring, and a third corrective action score for cleaning and servicing hydraulic piping. The third corrective action score may exceed the first and second corrective action scores.

In some embodiments, the model 116 includes associations between corrective actions 502 and standard procedures 705. For example, the model 116 may include an association between a corrective action of replacing a hydraulic manifold assembly and a standard procedure of oil manifold assembly replacement. In some embodiments, the model 116 includes associations between standard procedures 705 and/or corrective actions 502 and supporting procedures 805. For example, the model 116 may include an association between replacing a hydraulic manifold assembly and/or standard procedure of oil manifold assembly replacement and supporting procedures including oil manifold open-up and oil manifold close-up. As another example, the model 116 may include an association between cleaning and servicing hydraulic piping, a standard procedure of oil system servicing, and a supporting procedure for display of fluids. In some embodiments, the model 116 includes associations between corrective actions 502 and/or standard procedures 705 and one or more components 803 that may be utilized to implement the corrective action or standard procedure. For example, an oil and filter kit and an oil manifold assembly may be associated with a corrective action of replacing a hydraulic manifold assembly and/or standard procedures of oil manifold assembly replacement and oil system servicing. In some embodiments, the model 116 includes associations between one or more components 803 and one or more abnormal event causes 516. For example, the model 116 may include an association between an oil manifold assembly and a low or constricted oil supply fluid. As another example, the model 116 may include an association between an oil and filter kit and an oil supply air ingestion and/or contamination.

FIG. 9 shows a computing device 103 including an example graphical user interface (GUI) 127 for displaying corrective action data 108. In some embodiments, the GUI 127 includes a ranking 506 that includes a plurality of corrective actions ordered based at least in part on their respective corrective action scores 504. For example, the ranking 506 may include a first corrective action 502A associated with a first corrective action score 504 and a second corrective action 502B associated with a second corrective action score 504, where the first corrective action score 504 is greater than the second corrective action score 504. In some embodiments, each entry in the ranking 506 includes an identifier associated with the corresponding corrective action. For example, the first corrective action 502A may be identified by a text string "REPLACE THE OIL PUMP," and the second corrective action 502B may be identified by a text string "REPLACE BREATHER PRESSURIZING VALVE."

In some embodiments, the GUI 127 includes a selectable field 901 for displaying additional information associated with one or more corrective actions. For example, in response to receiving an input selecting a selectable field 901 associated with the first corrective action 502A, the computing device 103 may update the GUI 127 to include additional information associated with the corrective action 502A, such as components required to perform the corrective action, documentation and/or training materials associated with the corrective action, indications of personnel associated with performing the corrective action, a cost of performing the corrective action, a time interval associated with performing the corrective action, and/or the like. In some embodiments, in response to the computing device 103 receiving a selection of the selectable field 901, the corrective action system 101 receives from the computing device 103 a request for additional information associated with the corrective action. In some embodiments, based at least in part on the corrective action indicated by the request, the corrective action system 101 obtains additional information associated with the corrective action from one or more data stores 102. The corrective action system 101 may cause outputting of the additional information to the computing device 103 for rendering.

In some embodiments, the GUI 127 includes a selectable field 903 for receiving feedback respective to one or more corrective actions. In some embodiments, the selectable field 903 receives one or more inputs for indicating a successfulness of resolution associated with implementing a corrective action from the ranking 506. For example, in response to selection via a user input, the computing device 103 (or corrective action system 101) may update the selectable field 903 to include a plurality of options for indicating a level of success associated with implementing the corrective action, such as partial success, total success, partial failure, total failure, and/or the like. In some embodiments, the selectable field 903 receives one or more inputs that indicate a change to and/or status of one or more vehicle parameters, components, processes, and/or the like. In some embodiments, the corrective action system 101 generates feedback data and updates one or more models based at least in part on inputs to one or more selectable fields 903. In some embodiments, the GUI 127 includes one or more selectable fields for requesting approval to perform a corrective action from the ranking. For example, in response to receiving a user input to a selectable field, the computing device 103 may provision a request to a second computing device 103 associated with a vehicle manager, administrator, owner, and/or the like, where the request indicates one or more corrective actions, one or more abnormal event definitions, data associated with a vehicle 109, and/or the like.

In some embodiments, the GUI 127 includes one or more diagnostic actions 905 that may be performed to determine an appropriateness of performing one or more corrective actions. For example, a diagnostic action associated with a corrective action of replacing an oil pump may include checking for oil leaks, measuring oil leakage rates, and/or the like. In some embodiments, the GUI 127 includes a selectable field for indicating a result of the diagnostic action. For example, the GUI 127 may include a selectable field configured to receive a user input indicative of whether an oil leak check confirmed the presence of an oil link. As another example, the GUI 127 may include a selectable field configured to receive a user input indicative of a transfer gearbox (TBG) pressure taken at take-off power. In some embodiments, the corrective action system 101 updates one or models 116 based at least in part on results of one or more diagnostic actions.

Example Processes of the Disclosure

Having described example systems and apparatuses, data architectures, data flows, and graphical representations in accordance with the disclosure, example processes of the disclosure will now be discussed. It will be appreciated that each of the flowcharts depicts an example computer-implemented process that is performable by one or more of the apparatuses, systems, devices, and/or computer program products described herein, for example utilizing one or more of the specially configured components thereof.

The blocks indicate operations of each process. Such operations may be performed in any of a number of ways, including, without limitation, in the order and manner as depicted and described herein. In some embodiments, one or more blocks of any of the processes described herein occur in-between one or more blocks of another process, before one or more blocks of another process, in parallel with one or more blocks of another process, and/or as a sub-process of a second process. Additionally, or alternatively, any of the processes in various embodiments include some or all operational steps described and/or depicted, including one or more optional blocks in some embodiments. With regard to the flowcharts illustrated herein, one or more of the depicted block(s) in some embodiments is/are optional in some, or all, embodiments of the disclosure. Optional blocks are depicted with broken (or "dashed") lines. Similarly, it should be appreciated that one or more of the operations of each flowchart may be combinable, replaceable, and/or otherwise altered as described herein.

FIG. 10 illustrates a flowchart depicting operations of an example process 1000 for generating a ranking of corrective actions in accordance with at least some example embodiments of the present disclosure. In some embodiments, the process 1000 is embodied by computer program code stored on a non-transitory computer-readable storage medium of a computer program product configured for execution to perform the process as depicted and described. Additionally, or alternatively, in some embodiments, the process 1000 is performed by one or more specially configured computing devices, such as apparatus 200 alone or in communication with one or more other component(s), device(s), system(s), and/or the like. In this regard, in some such embodiments, the apparatus 200 is specially configured by computer-coded instructions (e.g., computer program instructions) stored thereon, for example in the memory 203 and/or another component depicted and/or described herein and/or otherwise accessible to the apparatus 200, for performing the operations as depicted and described.

In some embodiments, the apparatus 200 is in communication with one or more internal or external apparatus(es), system(s), device(s), and/or the like, to perform one or more of the operations as depicted and described. For example, the apparatus 200 may communicate with a computing device 103, vehicle 109, vehicle traffic system 111, environment monitoring system 113, and/or the like to perform one or more operations of the process 1000. In some embodiments, the apparatus 200 performs the process 1000 to generate and update rankings of corrective actions for remediating an abnormal event. For example, the apparatus 200 may perform the process 1000 in substantially real-time to the implementation of corrective actions and receipt of feedback data. In doing so, the apparatus 200 may continuously update one or more models for scoring and ranking corrective actions that are most likely to mitigate, improve, or reduce one or more safety risks associated with an abnormal event. In various embodiments, the described techniques overcome technical challenges associated with improving and ensuring the accuracy and efficiency of operations for remediating abnormal events.

At operation 1003, the apparatus 200 includes means such as the modeling circuitry 212, data processing circuitry 209, the communications circuitry 205, the input/output circuitry 207, the processor 201, and/or the like, or a combination thereof, that generating a ranking of corrective actions for one or more predefined abnormal events using a model. For example, using a model 116 that establishes mappings between an abnormal event definition 110 and historical data 112, the apparatus 200 may generate a respective corrective action score 504 for a plurality of corrective actions 502. The model 116 may generate a ranking 506 of the plurality of corrective actions 502 based on the corrective action scores 504. In some embodiments, the historical data includes one or more abnormal event triggers, abnormal event categories, abnormal event security levels, abnormal event validation pathways, abnormal event causes, historical corrective actions, and/or the like. In some embodiments, the apparatus 200 stores the iteration of the model 116 that generated the corrective action scores 504. For example, the apparatus 200 may store the iteration of the model 116 at the data store 102 and in association with a model identifier, vehicle identifier, abnormal event identifier, and/or the like such that the apparatus 200 may subsequently retrieve and update the model iteration based at least in part on feedback data 114.

At operation 1006, the apparatus 200 includes means such as the modeling circuitry 212, the data processing circuitry 209, the communications circuitry 205, the input/output circuitry 207, the processor 201, and/or the like, or a combination thereof, that cause rendering of the corrective action ranking on a computing device. For example, the apparatus 200 may cause rendering of a graphical user interface (GUI) 127 including the ranking 506 on a display 123 of a computing device 103. In some embodiments, the GUI 127 includes one or more selectable fields that enable the computing device 103 to receive input for indicating a successfulness of resolution in implementing a corrective action 502 from the ranking 506. For example, the GUI 127 may include a feedback field 903 (e.g., as shown in FIG. 9 and described herein) for each entry of the ranking 506 such that the computing device 103 may receive feedback respective to the corresponding corrective action 502. In some embodiments, the GUI 127 includes the respective corrective action score 504 for each corrective action 502 in the ranking 506. In some embodiments, the GUI 127 includes one or more selectable fields that enable rendering of additional information associated with a respective corrective action 502. For example, in response to the GUI 127 receiving an input to a selectable field, the apparatus 200 or computing device 103 may cause rendering of one or more components, procedures, costs, durations, and/or the like that are associated with performing the corresponding corrective action 502.

At operation 1009, the apparatus 200 includes means such as the modeling circuitry 212, the data processing circuitry 209, the communications circuitry 205, the input/output circuitry 207, the processor 201, and/or the like, or a combination thereof, that receive feedback data associated with one or more corrective actions. For example, the apparatus 200 may receive, from the computing device 103, feedback data 114 associated with a corrective action 502 indicated in the ranking 506. In some embodiments, the feedback data 114 indicates a result of the performance of the corrective action 502. For example, the feedback data 114 may indicate whether the corrective action 502 successfully resolved the predefined abnormal event. In another example the feedback data 114 may indicate a level of successfulness of resolving the abnormal event, such as a level of improvement in engine performance or a change in
delta of one or more sensor readings respective to one or
more threshold values or ranges. In another example, the
feedback data 114 may indicate a delta in the frequency of
occurrence of the abnormal event. In some embodiments,
the feedback data 114 includes metadata including a time-
stamp associated with performance of a corrective action, a
location at which the corrective action was performed, a
model identifier associated with the model iteration that
generated the corrective action ranking, respective identifi-
ers for components utilized in performance of the corrective
action, and/or the like.

At operation 1012, the apparatus 200 includes means such
as the modeling circuitry 212, the data processing circuitry
209, the communications circuitry 205, the input/output
circuitry 207, the processor 201, and/or the like, or a
combination thereof, that obtain update the model of opera-
tion 1003 based at least in part on the feedback data. For
example, the apparatus 200 may update the model 116 of
operation 1003 based at least in part on the feedback data
114 of operation 1009. In some embodiments, based at least
in part on the feedback data 114, the apparatus 200 adjusts
one or more weight values, probability metrics, and/or the
like that are utilized by the model 116 to generate corrective
actions, corrective action scores, and/or the like. For
example, in response to feedback data 114 that indicates a
top-scoring corrective action 502 was unsuccessful in reme-
diating an abnormal event, the apparatus 200 may adjust one
or more weight values associated with the corrective action
502 such that the updated model 116 may generate a lower
corrective action score 504 for the corrective action 502 in
subsequent iterations of the process 1000. In some embodi-
ments, based at least in part on the updated model 116, the
apparatus 200 generates an updated ranking of the corrective
actions associated with operation 1003.

At operation 1015, the apparatus 200 includes means such
as the modeling circuitry 212, the data processing circuitry
209, the communications circuitry 205, the input/output
circuitry 207, the processor 201, and/or the like, or a
combination thereof, that receive data associated with a
vehicle. For example, the apparatus 200 may receive data
associated with a vehicle 109. In some embodiments, the
apparatus 200 receives the data associated with the vehicle
109 from the vehicle 109, one or more computing devices
103, one or more vehicle traffic systems 111, one or more
environment monitoring systems 113, and/or the like. In
some embodiments, the data associated with the vehicle
includes vehicle-associated data 118 including sensor data
518, flight operational quality assurance (FOQA) data 520,
control data 522, environmental data 524, vehicle infrastruc-
ture data 526, and/or the like. For example, the apparatus
200 may receive readings, alerts, and/or the like from one or
more sensors 117 of the vehicle 109. The apparatus 200 may
receive data from a vehicle recording system 115 including
airspeed, groundspeed, calibrated airspeed (CAS), exhaust
gas temperature (EGT), flap position, brake position, throttle
position, gross weight, pitch, height above touchdown
(HAT), heading, roll, vertical acceleration, altitude, landing
gear position, and/or the like.

In another example, the apparatus 200 may receive
vehicle commands, maneuvers, user inputs and/or the like
provided to controls 119 or input devices 121 of the vehicle
109. As another example, the apparatus 200 may receive one
or more weather conditions, wind conditions, and/or the like
from an environment monitoring system 113. In another
example, the apparatus 200 may receive data from a vehicle
traffic system 111 including runway conditions, ground traffic conditions (e.g., vehicle traffic density, schedules,
landing site availability), measurements of vehicle perfor-
mance from systems external to the vehicle 109, and/or the
like. In some embodiments, the data associated with the
vehicle 109 includes one or more abnormal event identifiers
such that the apparatus 200 may link the data to one or more
abnormal event definitions based at least in part on the
abnormal event identifier.

At operation 1018, the apparatus 200 includes means such
as the modeling circuitry 212, the data processing circuitry
209, the communications circuitry 205, the input/output
circuitry 207, the processor 201, and/or the like, or a
combination thereof, that link the data associated with the
vehicle to one or more abnormal event definitions. For
example, the apparatus 200 may link the data associated
with the vehicle 109 to one or more abnormal event defi-
nitions 110. In some embodiments, the apparatus 200 links
the data to one or more abnormal event definitions by
processing the data using a model 116. For example, using
the model 116, one or more abnormal event definitions 110,
historical data 112, and/or the like, the apparatus 200 may
associate the data associated with the vehicle with one or
more abnormal event triggers 508, one or more abnormal
event categories 510, one or more abnormal event security
levels 512, one or more abnormal event validation pathways
514, one or more abnormal event causes 516, and/or the like.
Based at least in part on the various associations, the model
116 may link the data associated with the vehicle to a
corresponding abnormal event definition 110. Alternatively,
or additionally, in some embodiments, the data associated
with the vehicle includes an abnormal event identifier, and
the apparatus 200 links the data to an abnormal event
definition 110 based at least in part on the abnormal event
identifier. For purposes of describing example aspects of the
present techniques, the proceeding description of operation
1024 is provided in a context in which the apparatus 200
links the data associated with the vehicle to the same
abnormal event definition 110 associated with operations
1003-1015.

At operation 1021, the apparatus 200 optionally includes
means such as the modeling circuitry 212, the data process-
ing circuitry 209, the communications circuitry 205, the
input/output circuitry 207, the processor 201, and/or the like,
or a combination thereof, that generate and store a data
object indictive of a new abnormal event in response to a
failure to link the data associated with the vehicle to an
existing abnormal event definition. For example, at opera-
tion 1018, the apparatus 200 may fail to link the data
associated with the vehicle to any abnormal event definitions
110. In response to the failure, the apparatus 200 may
generate and store at the data store 102 a new abnormal
event definition 110 based at least in part on the data
associated with the vehicle.

At operation 1024, the apparatus 200 includes means such
as the modeling circuitry 212, the data processing circuitry
209, the communications circuitry 205, the input/output
circuitry 207, the processor 201, and/or the like, or a
combination thereof, that generate one or more corrective
action scores. For example, the apparatus 200 may generate
one or more corrective action scores using the updated
model 116 from operation 1012 and based at least in part on
the data associated with the vehicle. In some embodiments,
the apparatus 200 generates a respective corrective action
score for each of a plurality of corrective actions associated
with the abnormal event definition to which the data asso-
ciated with the vehicle 109 was linked at operation 1018. In
some embodiments, the apparatus 200 generates an updated ranking of the plurality of corrective actions based at least in part on the updated corrective action scores. For example, the apparatus 200 may update the corrective action ranking of operation 1006 based at least in part on the updated corrective action scores. The updated corrective action ranking may embody a reordered listing of corrective actions based at least in part on the feedback data of operation 1012, which may indicate, for example, a reduced successfulness of resolution associated with implementing a top-ranked corrective action or an increased successfulness of resolution associated with a lower-ranked corrective action.

At operation 1027, the apparatus 200 optionally includes means such as the modeling circuitry 212, the data processing circuitry 209, the communications circuitry 205, the input/output circuitry 207, the processor 201, and/or the like, or a combination thereof, that cause outputting of the corrective action scores of operation 1024 to a second computing device 103. For example, the apparatus 200 may cause provision of the corrective action scores to the second computing device 103. In some embodiments, the second computing device 103 is associated with the vehicle 109 of operation 1015. For example, the second computing device 103 may be associated with one or more operators, maintenance personnel, or administrative personnel associated with the vehicle 109. In some embodiments, the apparatus 200 causes rendering of a GUI 127 on a display 123 of the second computing device 103, where the GUI 127 includes the corrective action scores of operation 1024. The GUI 127 may further include information identifying each of the plurality of corrective actions associated with the abnormal event definition (e.g., to which the data associated with the vehicle 109 was linked at operation 1015). The information may include a title of the corrective action, one or more components associated with performing the corrective action, one or more portions or systems of the vehicle 109 associated with the corrective action, and/or the like.

At operation 1030, the apparatus 200 optionally includes means such as the modeling circuitry 212, the data processing circuitry 209, the communications circuitry 205, the input/output circuitry 207, the processor 201, and/or the like, or a combination thereof, that cause rendering of an updated ranking of the corrective actions at a computing device 103. For example, the apparatus 200 may cause rendering of a GUI at one or more computing devices 103 associated with the vehicle 109 for which associated data was obtained at operation 1015. The GUI may include an updated ranking of the corrective actions 502 ranked and rendered at operation 1006. In some embodiments, the apparatus 200 renders on the GUI one or more selectable fields for receiving feedback data associated with one or more corrective actions 502, causing display of additional information (e.g., diagnostics, procedures, components, and/or the like), indicating diagnostic test results, and/or the like. In some embodiments, based at least in part on feedback data, such as results of one or more diagnostic tests, the apparatus 200 may generate an additional updated ranking of the corrective actions 502 and further update the GUI to include the most recent iteration of the ranking.

CONCLUSION

Although an example processing system has been described above, implementations of the subject matter and the functional operations described herein can be implemented in other types of digital electronic circuitry, or in computer software, firmware, or hardware, including the structures disclosed in this specification and their structural equivalents, or in combinations of one or more of them.

Embodiments of the subject matter and the operations described herein can be implemented in digital electronic circuitry, or in computer software, firmware, or hardware, including the structures disclosed in this specification and their structural equivalents, or in combinations of one or more of them. Embodiments of the subject matter described herein can be implemented as one or more computer programs, i.e., one or more modules of computer program instructions, encoded on computer storage medium for execution by, or to control the operation of, information/data processing apparatus. Alternatively, or in addition, the program instructions can be encoded on an artificially-generated propagated signal, e.g., a machine-generated electrical, optical, or electromagnetic signal, which is generated to encode information/data for transmission to suitable receiver apparatus for execution by an information/data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described herein can be implemented as operations performed by an information/data processing apparatus on information/data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a repository management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a standalone program or as a module, component, subroutine, object, or other unit suitable for use in a computing environment. A computer program may, but need not, correspond to a file in a file system. A program can be stored in a portion of a file that holds other programs or information/data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described herein can be performed by one or more programmable processors executing one or more computer programs to perform actions by operating on input information/data and generating output. Processors suitable for the execution of a computer program include, by way of example, both general and special purpose microprocessors, and any one or more processors of any kind of digital computer. Generally, a processor will receive instructions and information/data from a read-only memory or a random-access memory or both. The essential elements of a computer are a processor for performing actions in accordance with instructions and one or more memory devices for storing instructions and data. Generally, a computer will also include, or be operatively coupled to receive information/data from or transfer information/data to, or both, one or more mass storage devices for storing data, e.g., magnetic, magneto-optical disks, or optical disks. However, a computer need not have such devices. Devices suitable for storing computer program instructions and information/data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described herein can be implemented on a computer having a display device, e.g., a CRT (cathode ray tube) or LCD (liquid crystal display) monitor, for displaying information/data to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described herein can be implemented in a computing system that includes a back-end component, e.g., as an information/data server, or that includes a middleware component, e.g., an application server, or that includes a front-end component, e.g., a client computer having a graphical user interface or a web browser through which a user can interact with an implementation of the subject matter described herein, or any combination of one or more such back-end, middleware, or front-end components. The components of the system can be interconnected by any form or medium of digital information/data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits information/data (e.g., an HTML page) to a client device (e.g., for purposes of displaying information/data to and receiving user input from a user interacting with the client device). Information/data generated at the client device (e.g., a result of the user interaction) can be received from the client device at the server.

In some embodiments, some of the operations above may be modified or further amplified. Furthermore, in some embodiments, additional optional operations may be included. Modifications, amplifications, or additions to the operations above may be performed in any order and in any combination.

Many modifications and other embodiments of the disclosure set forth herein will come to mind to one skilled in the art to which this disclosure pertains having the benefit of the teachings presented in the foregoing description and the associated drawings. Therefore, it is to be understood that the embodiments are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

While this specification contains many specific implementation details, these should not be construed as limitations on the scope of any disclosures or of what may be claimed, but rather as descriptions of features specific to particular embodiments of particular disclosures. Certain features that are described herein in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer-implemented method, comprising:
causing rendering of a graphical user interface (GUI) via a computing device, wherein:
the GUI comprises a ranking of a plurality of corrective actions associated with at least one abnormal event, wherein respective corrective actions are configured to remediate the at least one abnormal event; and
the ranking of the plurality of corrective actions is obtained from a model that establishes mappings between the at least one predefined abnormal event and historical data;
receiving, from the computing device, feedback data via the GUI, the feedback data indicating a successfulness of resolution associated with implementing at least one of the plurality of corrective actions;
updating the model to improve a scoring of the at least one predefined abnormal event based at least in part on the feedback data;
receiving data associated with a vehicle;
linking the data associated with the vehicle and the at least one predefined abnormal event;
generating, using the updated model, a respective corrective action score for the plurality of corrective actions based at least in part on the data associated with the vehicle and the at least one predefined abnormal event, wherein:
a respective corrective action score indicates a likelihood that a corresponding corrective action will cause at least one of mitigation, improvement, or reduction of a safety risk of the at least predefined one abnormal event; and
causing outputting of the plurality of corrective action scores to a second computing device.

2. The method of claim 1, further comprising:
generating an updated ranking of the plurality of corrective actions based at least in part on the plurality of corrective action scores; and
causing rendering of a second GUI via the second computing device, the second GUI comprising the updated ranking.

3. The method of claim 1, wherein:
the data associated with the vehicle comprises sensor data from at least one vehicle sensor.

4. The method of claim 1, wherein:
the data associated with the vehicle comprises flight operational quality assurance (FOQA) data.

5. The method of claim 1, wherein: the data associated with the vehicle comprises one or more vehicle commands or maneuvers performed by an operator of the vehicle.

6. The method of claim 1, wherein: the data associated with the vehicle comprises one or more user inputs provided by an operator of the vehicle.

7. The method of claim 1, wherein: the data associated with the vehicle comprises environmental data associated with the vehicle.

8. The method of claim 7, wherein:
the environmental data comprises at least one wind or weather condition experienced by the vehicle.

9. The method of claim 1, wherein: the data associated with the vehicle comprises vehicle infrastructure data comprising at least one of a runway condition or a ground traffic condition.

10. The method of claim 1, further comprising:
in response to a failure to link the data associated with the vehicle and the at least one predefined abnormal event, generating and storing a data object indicative of a new abnormal event linked with the data associated with the vehicle.

11. An apparatus comprising at least one processor and at least one non-transitory memory having computer-coded instructions stored thereon that, in execution with at least one processor, cause the apparatus to:
cause rendering of a graphical user interface (GUI) via a computing device, wherein:
the GUI comprises a ranking of a plurality of corrective actions associated with at least one abnormal event, wherein respective corrective action are configured to remediate the at least one abnormal event; and
the ranking of the plurality of corrective actions is obtained from a model that establishes mappings between the at least one predefined abnormal event and historical data;
receive, from the computing device, feedback data via the GUI, the feedback data indicating a successfulness of resolution associated with implementing at least one of the plurality of corrective actions;
update the model to improve a scoring of the at least one predefined abnormal event based at least in part on the feedback data;
receive data associated with a vehicle; link the data associated with the vehicle and the at least one predefined abnormal event;
generate, using the updated model, a respective corrective action score for the plurality of corrective actions based at least in part on the data associated with the vehicle and the at least one predefined abnormal event, wherein:
a respective corrective action score indicates a likelihood that a corresponding corrective action cause at least one of mitigation, improvement, or reduction of a safety risk of the at least predefined one abnormal event; and
cause outputting of the ranking to the computing device via the GUI.

12. The apparatus of claim 11, wherein:
the historical data comprises at least one abnormal event trigger.

13. The apparatus of claim 11, wherein:
the historical data comprises at least one abnormal event category.

14. The apparatus of claim 11, wherein:
the historical data comprises at least one abnormal event security level.

15. The apparatus of claim 11, wherein:
the historical data comprises at least one abnormal event validation pathway.

16. The apparatus of claim 11, wherein:
the historical data comprises at least one abnormal event cause.

17. The apparatus of claim 11, wherein:
the historical data comprises at least one historical corrective action.

18. A computer program product comprising at least one non-transitory computer-readable storage medium having computer program code stored thereon that, in execution with at least one processor, is configured to:

cause rendering of a graphical user interface (GUI) via a computing device, wherein:

the GUI comprises a ranking of a plurality of corrective actions associated with at least one abnormal event, wherein respective corrective actions are configured to remediate the at least one abnormal event; and the ranking of the plurality of corrective actions is obtained from a model that establishes mappings between the at least one predefined abnormal event and historical data;

receive, from the computing device, feedback data via the GUI, the feedback data indicating a successfulness of resolution associated with implementing at least one of the plurality of corrective actions;

update the model to improve a scoring of the at least one predefined abnormal event based at least in part on the feedback data;

receive data associated with a vehicle;

link the data associated with the vehicle and the at least one predefined abnormal event;

generate, using the updated model, a respective corrective action score for the plurality of corrective actions based at least in part on the data associated with the vehicle and the at least one predefined abnormal event, wherein:

a respective corrective action score indicates a likelihood that a corresponding corrective action cause at least one of mitigation, improvement, or reduction of a safety risk of the at least predefined one abnormal event; and cause outputting of the ranking to the computing device via the GUI.

\* \* \* \* \*